US012574752B2

(12) United States Patent　　　(10) Patent No.:　US 12,574,752 B2

Shuai et al.　　　(45) Date of Patent:　Mar. 10, 2026

(54) RESOURCE SHARING METHOD AND APPARATUS

(71) Applicant: HUAWEI TECHNOLOGIES CO., LTD., Shenzhen (CN)

(72) Inventors: Yanglai Shuai, Shanghai (CN); Zhiyuan Chu, Shanghai (CN); Yan Zheng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 355 days.

(21) Appl. No.: 18/477,091

(22) Filed: Sep. 28, 2023

(65) Prior Publication Data

US 2024/0031819 A1　　Jan. 25, 2024

Related U.S. Application Data

(63) Continuation of application No. PCT/CN2022/082817, filed on Mar. 24, 2022.

(30) Foreign Application Priority Data

Apr. 9, 2021　(CN) ......................... 202110384733.X

(51) Int. Cl.
　　*H04W 16/14*　　　(2009.01)
　　*H04W 72/0453*　　(2023.01)
(52) U.S. Cl.
　　CPC ................................... *H04W 16/14* (2013.01)
(58) Field of Classification Search
　　CPC ...... H04L 5/0048; H04L 5/006; H04W 16/14; H04W 48/12; H04W 52/0206; H04W 72/0453

(Continued)

(56) References Cited

U.S. PATENT DOCUMENTS 7,269,151 B2 * 9/2007 Diener .................. H04L 1/1664
　　　　　　　　　　　　　　　　　　　　　370/329
9,986,577 B2 * 5/2018 Bose ..................... H04W 52/34
　　　　　　　　(Continued)

FOREIGN PATENT DOCUMENTS

CN　　　107079297 A　　8/2017
CN　　　110463242 A　　11/2019
　　　　　　(Continued)

OTHER PUBLICATIONS

Extended European Search Report issued in corresponding European Application No. 22783878.6, dated Sep. 9, 2024, pp. 1-10.

(Continued)

*Primary Examiner* — John Pezzlo
(74) *Attorney, Agent, or Firm* — HAUPTMAN HAM, LLP

(57)　　　　　　ABSTRACT

A resource sharing method and apparatus. A first network device determines a first control channel resource of a first cell from a first spectrum resource, where the first cell belongs to the first network device. The first network device sends a first message to a second network device, where the first message indicates a second network device to allocate a second control channel resource to a second cell from the first spectrum resource. The second cell belongs to the second network device. The first control channel resource and the second control channel resource belong to different parts of the first spectrum resource, and the first spectrum resource is a spectrum resource shared by the first cell and the second cell.

20 Claims, 18 Drawing Sheets

(58) Field of Classification Search
USPC ........................................ 370/252, 329, 430
See application file for complete search history.

(56) References Cited

U.S. PATENT DOCUMENTS

| | | | | |
|---|---|---|---|---|
| 11,627,470 | B1 * | 4/2023 | Gronstad ............. | H04W 16/10 |
| | | | | 370/329 |
| 11,979,882 | B2 * | 5/2024 | Dinan ................... | H04W 72/20 |
| 2013/0137447 | A1 | 5/2013 | Zhang et al. | |
| 2016/0308636 | A1 | 10/2016 | Deng et al. | |
| 2021/0377887 | A1 | 12/2021 | Yang et al. | |
| 2023/0189382 | A1 * | 6/2023 | Haustein .............. | H04W 76/20 |
| | | | | 370/329 |
| 2023/0319847 | A1 * | 10/2023 | Liu ................... | H04W 72/1263 |
| | | | | 370/329 |
| 2023/0379722 | A1 * | 11/2023 | Wang ................... | H04W 72/21 |

FOREIGN PATENT DOCUMENTS

| | | | |
|---|---|---|---|
| WO | 2018087663 | A1 | 5/2018 |
| WO | 2020164408 | A1 | 8/2020 |

OTHER PUBLICATIONS

Ericsson, Enhancements for dynamic spectrum sharing in Rel-16, 3GPP TSG-RAN Meeting #84 RP-191042 Newport Beach, CA, USA, Jun. 3-6, 2019, total 8 pages.
Chinese First Office Action issued in corresponding Chinese Application No. 202110384733, dated Mar. 28, 2025, pp. 1-16.

* cited by examiner

System 200 —

211

221

212

| Mobility management entity | | Core control entity |

| UE | Access network | Tunnel | Local serving gateway | Tunnel | Data gateway | PDN1 |
| | | | | | | PDN2 |
| | | | | | | PDN3 |

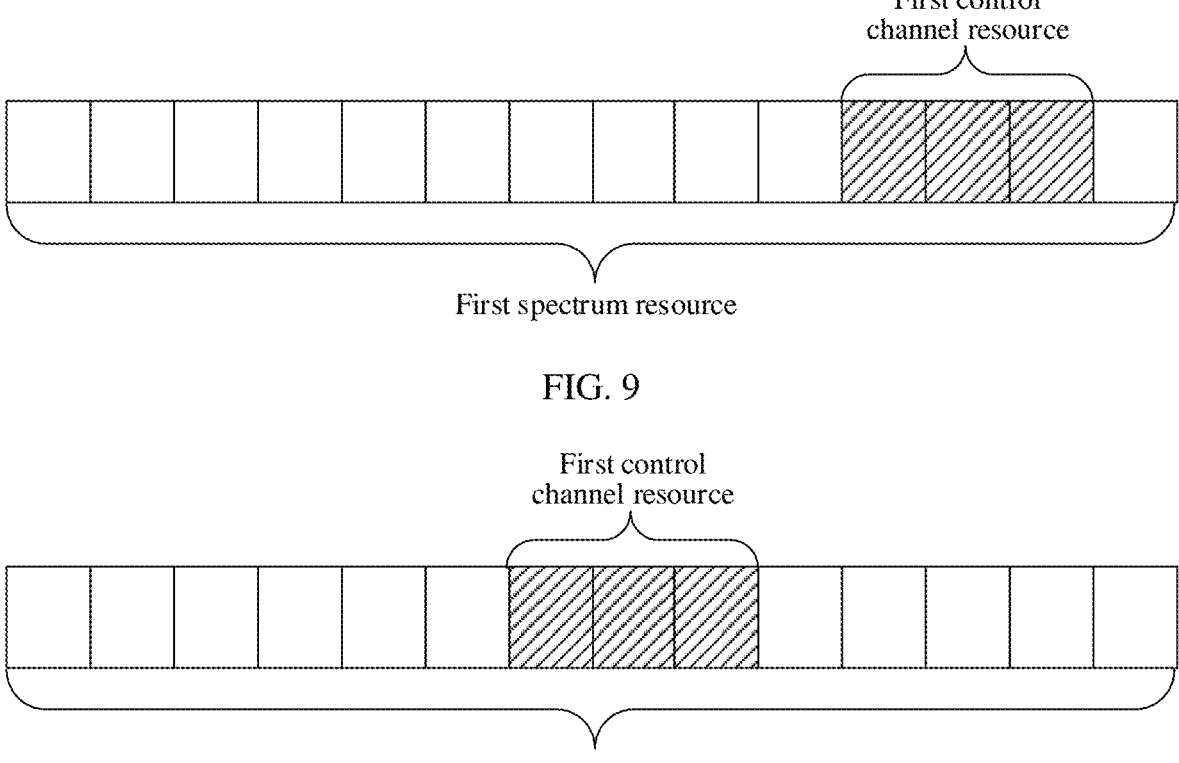
FIG. 9
FIG. 10
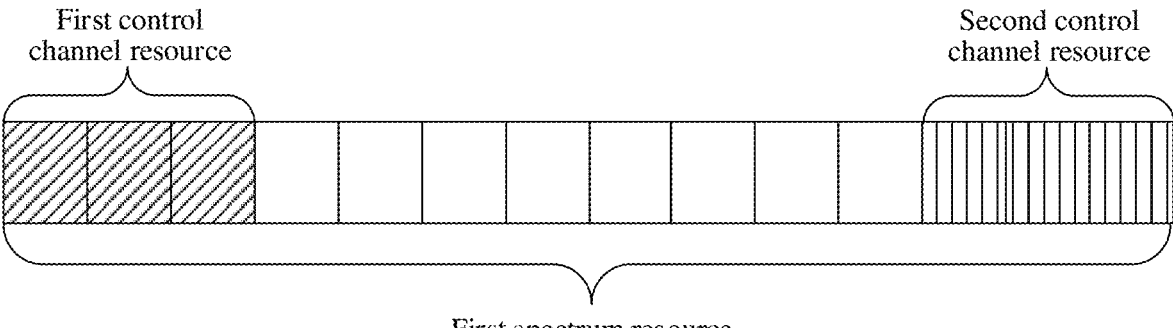
FIG. 11

3300

3400

RESOURCE SHARING METHOD AND APPARATUS

CROSS-REFERENCE TO RELATED APPLICATIONS

This application is a continuation of International Application No. PCT/CN2022/082817, filed on Mar. 24, 2022, which claims priority to Chinese Patent Application No. 202110384733.X, filed on Apr. 9, 2021. The disclosures of the aforementioned applications are hereby incorporated by reference in their entireties.

BACKGROUND

A wireless communication system has advantages such as rich service types and strong network control capabilities. However, due to factors such as limited frequency resources and harsh transmission environments, the wireless communication system cannot provide a high access rate. Emerging broadband wireless access technologies make up for this disadvantage. However, different wireless networks are divided into independent spectrum resources and do not affect each other. Even in response to a current network load being light, other network services cannot use the spectrum resources of the other network services, which causes a waste of spectrum resources.

SUMMARY

Embodiments described herein provide a resource sharing method. By enabling network devices to share spectrum resources, a problem of low utilization of the spectrum resources caused by independent division of the spectrum resources between network devices is improved.

According to a first aspect, a resource sharing method is provided. The method includes: A first network device determines a first control channel resource of a first cell from a first spectrum resource, where the first cell belongs to the first network device. The first network device sends a first message to a second network device, where the first message indicates a second network device to allocate a second control channel resource to a second cell in the first spectrum resource, the second cell belongs to the second network device, the first control channel resource and the second control channel resource belong to different parts of the first spectrum resource, and the first spectrum resource is a spectrum resource shared by the first cell and the second cell.

Based on the foregoing solution, a dynamic spectrum sharing mechanism is applied to enable dynamic spectrum sharing between cells in a wireless network. In response to a wireless network being lightly loaded, a spectrum of the wireless network is shared with another wireless network for use, thereby improving user experience and utilization efficiency of spectrum resources.

With reference to the first aspect, in some implementations of the first aspect, the first message includes at least one of the following information: identification information of the first cell, information about the first control channel resource, uplink initial bandwidth part (Bandwidth part, BWP) information of the first cell, downlink initial BWP information of the first cell, synchronization signal block SSB configuration information of the first cell, and identification information of the second cell.

With reference to the first aspect, in some implementations of the first aspect, the first network device receives a second message sent by the second network device, where the second message includes at least one of the following information: uplink initial BWP information of the second cell, downlink initial BWP information of the second cell, synchronization signal block (Synchronization signal and PBCH block, SSB) configuration information of the second cell, and information about the second control channel resource.

Based on the foregoing solution, the first network device obtains, by receiving the second message sent by the second network device, the information about the second cell and the information about the second control channel resource allocated by the second network device for the second cell.

With reference to the first aspect, in some implementations of the first aspect, the second control channel resource is in an end part of the first spectrum resource; or the first control channel resource is in an end part of the first spectrum resource, and the second control channel resource is in a start part of the first spectrum resource.

Based on the foregoing solution, as far as possible the first control channel resource and the second control channel resource do not overlap in the first spectrum resource.

With reference to the first aspect, in some implementations of the first aspect, the first network device receives a third message sent by a terminal device, where the third message includes at least one of information about reference signal received power or information about reference signal received quality of the second network device. The first network device determines, based on the third message, that the first cell and the second cell are cells that share the first spectrum resource.

Based on the foregoing solution, the first network device obtains, by receiving the third message sent by the terminal device, parameter information about the second network device, so as to determine whether the first cell and the second cell shares the first spectrum resource.

With reference to the first aspect, in some implementations of the first aspect, the determining that the first cell and the second cell are cells that share the first spectrum resource includes: In response to the first cell and the second cell satisfying a preset condition, the first network device determines that the first cell and the second cell are cells that share the first spectrum resource.

With reference to the first aspect, in some implementations of the first aspect, the preset condition includes at least one of the following conditions: a coverage range of the first cell and a coverage range of the second cell at least partially overlap, and the first cell and the second cell are capable of sharing a spectrum resource.

Based on the foregoing solution, the first network device determines, by determining the preset condition, whether the first cell and the second cell shares the first spectrum resource.

With reference to the first aspect, in some implementations of the first aspect, the method further includes: The first network device determines a first resource block (Resource block, RB) of the first cell from the first spectrum resource. The first network device sends a fourth message to the second network device, where the fourth message indicates the second network device to allocate a second RB to the second cell in the first spectrum resource, the first RB, the second RB, the first control channel resource, and the second control channel resource belong to different parts of the first spectrum resource.

Based on the foregoing solution, the first network device allocates the first RB to the first cell, and the first RB, the second RB, the first control channel resource, and the second control channel resource belong to different parts of the first spectrum resource.

With reference to the first aspect, in some implementations of the first aspect, the method further includes: The first network device receives a fifth message sent by the second network device, where the fifth message includes the information about the second RB.

Based on the foregoing solution, the first network device obtains, by receiving the fifth message sent by the second network device, the information about the second RB.

With reference to the first aspect, in some implementations of the first aspect, the determining, by the first network device, a first RB of the first cell from a first spectrum resource includes: The first network device determines first information, where the first information includes information about predicted telephone traffic or information about predicted service traffic of the first cell. The first network device determines the first RB of the first cell from the first spectrum resource based on the first information.

Based on the foregoing solution, the first network device accurately determines, by determining the first information, the first RB of the first cell based on the first information.

With reference to the first aspect, in some implementations of the first aspect, the method further includes: The first network device receives a sixth message sent by a traffic prediction function (Traffic prediction function, TPF) entity, where the sixth message includes the first information.

With reference to the first aspect, in some implementations of the first aspect, the method further includes: The first network device sends a seventh message to the TPF entity, where the seventh message indicates that the first network device has received the sixth message.

According to a second aspect, a resource sharing method is provided. The method includes: A second network device receives a first message sent by a first network device, where the first message indicates the second network device to allocate a second control channel resource to a second cell in a first spectrum resource, a first control channel resource of a first cell and the second control channel resource belong to different parts of the first spectrum resource, the first spectrum resource is a spectrum resource shared by the first cell and the second cell, the first cell belongs to the first network device, and the second cell belongs to the second network device. The second network device determines the second control channel resource of the second cell from the first spectrum resource.

Based on the foregoing solution, a dynamic spectrum sharing mechanism is applied to enable dynamic spectrum sharing between cells in a wireless network. In response to a wireless network being lightly loaded, a spectrum of the wireless network is shared with another wireless network for use, thereby improving user experience and utilization efficiency of spectrum resources.

With reference to the second aspect, in some implementations of the second aspect, the first message includes at least one of the following information:

identification information of the first cell, information about the first control channel resource, uplink initial BWP information of the first cell, downlink initial BWP information of the first cell, SSB configuration information of the first cell, and identification information of the second cell.

With reference to the second aspect, in some implementations of the second aspect, the method further includes: The second network device sends a second message to the first network device, where the second message includes at least one of the following information: uplink initial BWP information of the second cell, downlink initial BWP information of the second cell, SSB configuration information of the second cell, and information about the second control channel resource.

With reference to the second aspect, in some implementations of the second aspect, the first control channel resource is in a start part of the first spectrum resource, and the second control channel resource is in an end part of the first spectrum resource; or the first control channel resource is in an end part of the first spectrum resource, and the second control channel resource is in a start part of the first spectrum resource.

Based on the foregoing solution, as far as possible the first control channel resource and the second control channel resource do not overlap in the first spectrum resource.

With reference to the second aspect, in some implementations of the second aspect, the first cell and the second cell satisfy a preset condition.

With reference to the second aspect, in some implementations of the second aspect, the preset condition includes at least one of the following conditions: a coverage range of the first cell and a coverage range of the second cell at least partially overlap, and the first cell and the second cell are capable of sharing a spectrum resource.

With reference to the second aspect, in some implementations of the second aspect, the method further includes: The second network device receives a fourth message sent by the first network device, where the fourth message indicates the second network device to allocate a second RB to the second cell in the first spectrum resource, the first RB, the second RB, the first control channel resource, and the second control channel resource belong to different parts of the first spectrum resource. The second network device determines the second RB of the second cell from the first spectrum resource.

Based on the foregoing solution, the second network device allocates the second RB to the second cell, and the first RB, the second RB, the first control channel resource, and the second control channel resource belong to different parts of the first spectrum resource.

With reference to the second aspect, in some implementations of the second aspect, the method further includes: The second network device sends a fifth message to the first network device, where the fifth message includes the information about the second RB.

According to a third aspect, a resource sharing method is provided. The method includes: A first network device determines a first RB of a first cell from a first spectrum resource, where the first cell belongs to the first network device. The first network device sends a first message to a second network device, where the first message indicates the second network device to allocate a second RB to a second cell in the first spectrum resource, the second cell belongs to the second network device, the first RB and the second RB belong to different parts of the first spectrum resource, and the first spectrum resource is a spectrum resource shared by the first cell and the second cell.

Based on the foregoing solution, the first network device allocates the first RB to the first cell, and both the first RB and the second RB belong to different parts of the first spectrum resource.

With reference to the third aspect, in some implementations of the third aspect, the method further includes: The first network device receives a second message sent by the second network device, where the second message includes the information about the second RB.

Based on the foregoing solution, the first network device obtains, by receiving the second message sent by the second network device, the information about the second RB.

With reference to the third aspect, in some implementations of the third aspect, the determining, by the first network device, the first RB of the first cell from the first spectrum resource includes: The first network device determines first information, where the first information includes information about predicted telephone traffic or information about predicted service traffic of the first cell. The first network device determines the first RB of the first cell from the first spectrum resource based on the first information.

Based on the foregoing solution, the first network device accurately determines, by determining the first information, the first RB of the first cell based on the first information.

With reference to the third aspect, in some implementations of the third aspect, the method further includes: The first network device receives a third message sent by a TPF entity, where the third message includes the first information.

With reference to the third aspect, in some implementations of the third aspect, the method further includes: The first network device sends a fourth message to the TPF entity, where the fourth message indicates that the first network device has received the third message.

According to a fourth aspect, a resource sharing method is provided. The method includes: A second network device receives a first message sent by a first network device, where the first message indicates the second network device to allocate a second RB to a second cell in a first spectrum resource, the first RB and the second RB belong to different parts of the first spectrum resource, the first spectrum resource is a spectrum resource shared by a first cell and the second cell, the first cell belongs to the first network device, and the second cell belongs to the second network device. The second network device determines the second RB of the second cell from the first spectrum resource.

Based on the foregoing solution, the second network device allocates the second RB to the second cell, and both the first RB and the second RB belong to different parts of the first spectrum resource.

With reference to the fourth aspect, in some implementations of the fourth aspect, the method further includes: The second network device sends a second message to the first network device, where the second message includes information about the second RB.

According to a fifth aspect, a resource sharing apparatus is provided. The apparatus includes: a processing module, configured to determine a first control channel resource of a first cell from a first spectrum resource, where the first cell belongs to the first network device; and a transceiver module, configured to send a first message to a second network device, where the first message indicates the second network device to allocate a second control channel resource to a second cell in the first spectrum resource, the second cell belongs to the second network device, the first control channel resource and the second control channel resource belong to different parts of the first spectrum resource, and the first spectrum resource is a spectrum resource shared by the first cell and the second cell.

Based on the foregoing solution, a dynamic spectrum sharing mechanism is applied to enable dynamic spectrum sharing between cells in a wireless network. In response to a wireless network being lightly loaded, a spectrum of the wireless network is shared with another wireless network for use, thereby improving user experience and utilization efficiency of spectrum resources.

With reference to the fifth aspect, in some implementations of the fifth aspect, the first message includes at least one of the following information: identification information of the first cell, information about the first control channel resource, uplink initial bandwidth part BWP information of the first cell, downlink initial BWP information of the first cell, synchronization signal block SSB configuration information of the first cell, and identification information of the second cell.

With reference to the fifth aspect, in some implementations of the fifth aspect, the transceiver module is further configured to receive a second message sent by the second network device, where the second message includes at least one of the following information: uplink initial BWP information of the second cell, downlink initial BWP information of the second cell, SSB configuration information of the second cell, and information about the second control channel resource.

Based on the foregoing solution, information about the second cell and information about the second control channel resource allocated by the second network device for the second cell is obtained by receiving the second message sent by the second network device.

With reference to the fifth aspect, in some implementations of the fifth aspect, the second control channel resource is in an end part of the first spectrum resource; or the first control channel resource is in an end part of the first spectrum resource, and the second control channel resource is in a start part of the first spectrum resource.

Based on the foregoing solution, as far as possible that the first control channel resource and the second control channel resource do not overlap in the first spectrum resource.

With reference to the fifth aspect, in some implementations of the fifth aspect, the transceiver module is further configured to receive a third message sent by a terminal device, where the third message includes at least one of information about reference signal received power or information about reference signal received quality of the second network device. The first network device determines, based on the third message, that the first cell and the second cell are cells that share the first spectrum resource.

Based on the foregoing solution, parameter information about the second network device is obtained by receiving the third message sent by the terminal device, so as to determine whether the first cell and the second cell shares the first spectrum resource.

With reference to the fifth aspect, in some implementations of the fifth aspect, the determining that the first cell and the second cell are cells that share the first spectrum resource includes: In response to the first cell and the second cell satisfying a preset condition, the processing module is further configured to determine that the first cell and the second cell are cells that share the first spectrum resource.

With reference to the fifth aspect, in some implementations of the fifth aspect, the preset condition includes at least one of the following conditions: a coverage range of the first cell and a coverage range of the second cell at least partially overlap, and the first cell and the second cell are capable of sharing a spectrum resource.

Based on the foregoing solution a determination is made, by determining the preset condition, whether the first cell and the second cell shares the first spectrum resource.

With reference to the fifth aspect, in some implementations of the fifth aspect, the processing module is further configured to determine a first RB of the first cell from the first spectrum resource; and the transceiver module is further configured to send a fourth message to the second network device, where the fourth message indicates the second network device to allocate a second RB to the second cell in the first spectrum resource, the first RB and the second RB belong to different parts of the first spectrum resource, and the first spectrum resource is a spectrum resource shared by the first cell and the second cell.

Based on the foregoing solution, the first RB is allocated to the first cell, and the first RB, the second RB, the first control channel resource, and the second control channel resource belong to different parts of the first spectrum resource.

With reference to the fifth aspect, in some implementations of the fifth aspect, the transceiver module is further configured to receive a fifth message sent by the second network device, where the fifth message includes information about the second RB.

Based on the foregoing solution, the information about the second RB is obtained by receiving the fifth message sent by the second network device.

With reference to the fifth aspect, in some implementations of the fifth aspect, the determining the first RB of the first cell from the first spectrum resource includes: the processing module is further configured to determine first information, where the first information includes information about predicted telephone traffic or information about predicted service traffic of the first cell. The first network device determines the first RB of the first cell from the first spectrum resource based on the first information.

Based on the foregoing solution, the first RB of the first cell is relatively accurately determined based on the first information by determining the first information.

With reference to the fifth aspect, in some implementations of the fifth aspect, the transceiver module is further configured to receive a sixth message sent by a traffic prediction function TPF entity, where the sixth message includes the first information.

With reference to the fifth aspect, in some implementations of the fifth aspect, the processing module is further configured to send a seventh message to the TPF entity, where the seventh message indicates that the first network device has received the sixth message.

According to a sixth aspect, a resource sharing apparatus is provided. The apparatus includes: a transceiver module, configured to receive a first message sent by a first network device, where the first message indicates a second network device to allocate a second control channel resource to a second cell in a first spectrum resource, a first control channel resource of a first cell and the second control channel resource belong to different parts of the first spectrum resource, the first spectrum resource is a spectrum resource shared by the first cell and the second cell, the first cell belongs to the first network device, and the second cell belongs to the second network device; and a processing module, configured to determine the second control channel resource of the second cell from the first spectrum resource.

Based on the foregoing solution, a dynamic spectrum sharing mechanism is applied to enable dynamic spectrum sharing between cells in a wireless network. In response to a wireless network being lightly loaded, a spectrum of the wireless network is shared with another wireless network for use, thereby improving user experience and utilization efficiency of spectrum resources.

With reference to the sixth aspect, in some implementations of the sixth aspect, the first message includes at least one of the following information: identification information of the first cell, information about the first control channel resource, uplink initial BWP information of the first cell, downlink initial BWP information of the first cell, SSB configuration information of the first cell, and identification information of the second cell.

With reference to the sixth aspect, in some implementations of the sixth aspect, the transceiver module is further configured to send a second message to the first network device, where the second message includes at least one of the following information: uplink initial BWP information of the second cell, downlink initial BWP information of the second cell, SSB configuration information of the second cell, and information about the second control channel resource.

With reference to the sixth aspect, in some implementations of the sixth aspect, the first control channel resource is in a start part of the first spectrum resource, and the second control channel resource is in an end part of the first spectrum resource; or the first control channel resource is in an end part of the first spectrum resource, and the second control channel resource is in a start part of the first spectrum resource.

Based on the foregoing solution, as far as possible the first control channel resource and the second control channel resource do not overlap in the first spectrum resource.

With reference to the sixth aspect, in some implementations of the sixth aspect, the first cell and the second cell satisfy a preset condition.

With reference to the sixth aspect, in some implementations of the sixth aspect, the preset condition includes at least one of the following conditions: a coverage range of the first cell and a coverage range of the second cell at least partially overlap, and the first cell and the second cell are capable of sharing a spectrum resource.

With reference to the sixth aspect, in some implementations of the sixth aspect, the method further includes: the transceiver module is further configured to receive a fourth message sent by the first network device, where the fourth message indicates the second network device to allocate a second RB in the first spectrum resource to the second cell, the first RB and the second RB belong to different parts of the first spectrum resource, and the first spectrum resource is a spectrum resource shared by the first cell and the second cell; and the processing module is further configured to determine the second RB of the second cell from the first spectrum resource.

Based on the foregoing solution, the second RB is allocated to the second cell, and the first RB, the second RB, the first control channel resource, and the second control channel resource belong to different parts of the first spectrum resource.

With reference to the sixth aspect, in some implementations of the sixth aspect, the transceiver module is further configured to send, by the second network device, a fifth message to the first network device, where the fifth message includes information about the second RB.

According to a seventh aspect, a resource sharing apparatus is provided. The apparatus includes: a processing module, configured to determine a first RB of a first cell from a first spectrum resource, where the first cell belongs to a first network device; and a transceiver module, configured to send a first message to a second network device, where the first message indicates the second network device to allocate a second RB to a second cell in the first spectrum resource, the second cell belongs to the second network device, the first RB and the second RB belong to different parts of the first spectrum resource, and the first spectrum resource is a spectrum resource shared by the first cell and the second cell.

Based on the foregoing solution, the first RB is allocated to the first cell, and both the first RB and the second RB belong to different parts of the first spectrum resource.

With reference to the seventh aspect, in some implementations of the seventh aspect, the transceiver module is configured to receive a second message sent by the second network device, where the second message includes information about the second RB.

Based on the foregoing solution, the information about the second RB is obtained by receiving the second message sent by the second network device.

With reference to the seventh aspect, in some implementations of the seventh aspect, the determining the first RB of the first cell from the first spectrum resource includes: the processing module is further configured to determine first information, where the first information includes information about predicted telephone traffic or information about predicted service traffic of the first cell; and determine the first RB of the first cell from the first spectrum resource based on the first information.

Based on the foregoing solution, the first RB of the first cell is relatively accurately determined based on the first information by determining the first information.

With reference to the seventh aspect, in some implementations of the seventh aspect, the transceiver module is further configured to receive a third message sent by a TPF entity, where the third message includes the first information.

With reference to the seventh aspect, in some implementations of the seventh aspect, the transceiver module is further configured to send a fourth message to the TPF entity, where the fourth message indicates that the first network device has received the third message.

According to an eighth aspect, a resource sharing apparatus is provided. The apparatus includes: a transceiver module, configured to receive a first message sent by a first network device, where the first message indicates a second network device to allocate a second RB to a second cell in a first spectrum resource, a first RB and the second RB belong to different parts of the first spectrum resource, the first spectrum resource is a spectrum resource shared by a first cell and the second cell, the first cell belongs to the first network device, and the second cell belongs to the second network device; and a processing module, configured to determine the second RB of the second cell from the first spectrum resource.

Based on the foregoing solution, the second network device allocates the second RB to the second cell, and both the first RB and the second RB belong to different parts of the first spectrum resource.

With reference to the eighth aspect, in some implementations of the eighth aspect, the transceiver module is further configured to send a second message to the first network device, where the second message includes information about the second RB.

According to a ninth aspect, a communication apparatus is provided, and includes a processor. The processor is coupled to a memory, and is configured to execute instructions in the memory, to implement the communication method in the first aspect or the third aspect and any possible implementation of the first aspect or the third aspect. Optionally, the communication apparatus further includes the memory. Optionally, the communication apparatus further includes a communication interface. The processor is coupled to the communication interface, and the communication interface is configured to input and/or output information. The information includes at least one of instructions and data.

In an implementation, the communication apparatus is a network device. In response to the communication apparatus being the network device, the communication interface is a transceiver or an input/output interface.

In another implementation, the communication apparatus is a chip or a chip system. In response to the communication apparatus being the chip or the chip system, the communication interface is an input/output interface, or is an input/output interface, an interface circuit, an output circuit, an input circuit, a pin, or a related circuit on the chip or the chip system. The processor is also embodied as a processing circuit or a logic circuit.

In another implementation, the communication apparatus is a chip or a chip system configured in a network device.

Optionally, the transceiver is a transceiver circuit. Optionally, the input/output interface is an input/output circuit.

According to a tenth aspect, a communication apparatus is provided, and includes a processor. The processor is coupled to a memory, and is configured to execute instructions in the memory, to implement the communication method in the second aspect or the fourth aspect and any possible implementation of the second aspect or the fourth aspect. Optionally, the communication apparatus further includes the memory. Optionally, the communication apparatus further includes a communication interface. The processor is coupled to the communication interface, and the communication interface is configured to input and/or output information. The information includes at least one of instructions and data.

In an implementation, the communication apparatus is a network device. In response to the communication apparatus being the network device, the communication interface is a transceiver or an input/output interface.

In another implementation, the communication apparatus is a chip or a chip system. In response to the communication apparatus being the chip or the chip system, the communication interface is an input/output interface, an interface circuit, an output circuit, an input circuit, a pin, or a related circuit on the chip or the chip system. The processor is also embodied as a processing circuit or a logic circuit.

In another implementation, the communication apparatus is a chip or a chip system configured in a network device.

Optionally, the transceiver is a transceiver circuit. Optionally, the input/output interface is an input/output circuit.

According to an eleventh aspect, a computer-readable storage medium is provided. The computer readable storage medium stores a computer program. In response to the computer program being executed by a communication apparatus, the communication apparatus is enabled to implement the resource sharing method in any one of the first aspect or the third aspect and the possible implementations of the first aspect or the third aspect.

According to a twelfth aspect, a computer-readable storage medium is provided. The computer-readable storage medium stores a computer program. In response to the computer program being executed by a communication apparatus, the communication apparatus is enabled to implement the resource sharing method in any one of the second aspect or the fourth aspect and the possible implementations of the second aspect or the fourth aspect.

According to a thirteenth aspect, a computer program product including instructions is provided. In response to the instructions being executed by a computer, a communication apparatus is enabled to implement the resource sharing method according to the first aspect or the third aspect.

According to a fourteenth aspect, a computer program product including instructions is provided. In response to the instructions being executed by a computer, a communication apparatus is enabled to implement the resource sharing method according to the second aspect or the fourth aspect.

According to a fifteenth aspect, a chip is provided. The chip includes a processor and a data interface. The processor reads, through the data interface, instructions stored in a memory, to implement the resource sharing method according to the first aspect or the third aspect.

According to a sixteenth aspect, a chip is provided. The chip includes a processor and a data interface. The processor reads, through the data interface, instructions stored in a memory, to implement the resource sharing method according to the second aspect or the fourth aspect.

BRIEF DESCRIPTION OF DRAWINGS

FIG. 5 is a schematic diagram of a resource sharing method 500 according to;

FIG. 9 is another schematic diagram of allocating a first control channel resource according to at least one embodiment;

FIG. 10 is another schematic diagram of allocating a first control channel resource according to at least one embodiment;

FIG. 11 is a schematic diagram of allocating a second control channel resource according to at least one embodiment;

DESCRIPTION OF EMBODIMENTS

The following describes technical solutions of at least one embodiment with reference to the accompanying drawings.

The technical solutions in embodiments of at least one embodiment is applied to various communication systems, for example, a 5th generation (5th generation, 5G) system or an NR system, a long term evolution (long term evolution, LTE) system, an LTE frequency division duplex (frequency division duplex, FDD) system, an LTE time division duplex (time division duplex, TDD) system, and a universal mobile telecommunication system (universal mobile telecommunication system, UMTS).

Figure 1:
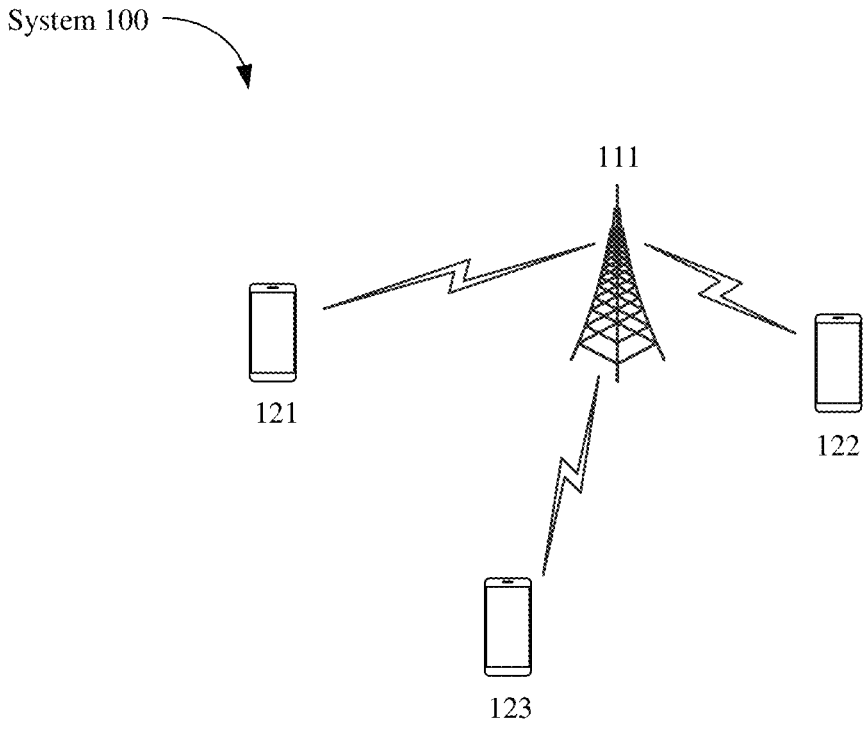
FIG. 1 is a schematic diagram of a wireless communication system 100 according to at least one embodiment.

FIG. 1 is a schematic diagram of a wireless communication system 100 according to at least one embodiment. As shown in FIG. 1, the wireless communication system 100 includes at least one network device, for example, a network device 111 shown in FIG. 1. The wireless communication system 100 further includes at least one terminal device, for example, a terminal device 121 to a terminal device 123 shown in FIG. 1. A plurality of antennas is configured for both the network device and the terminal device, and the network device and the terminal device communicates with each other by using a multi-antenna technology.

In response to the network device communicating with the terminal device, the network device manages one or more cells, and one cell has an integer quantity of terminal devices. Optionally, the network device 111 and the terminal device 121 to the terminal device 123 form a single-cell communication system. Without loss of generality, a cell is denoted as a cell #1. The network device 111 is a network device in the cell #1, or the network device 111 serves a terminal device (for example, the terminal device 121) in the cell #1.

A cell is understood as a region within coverage of a wireless signal of a network device.

Figures 2, 3:
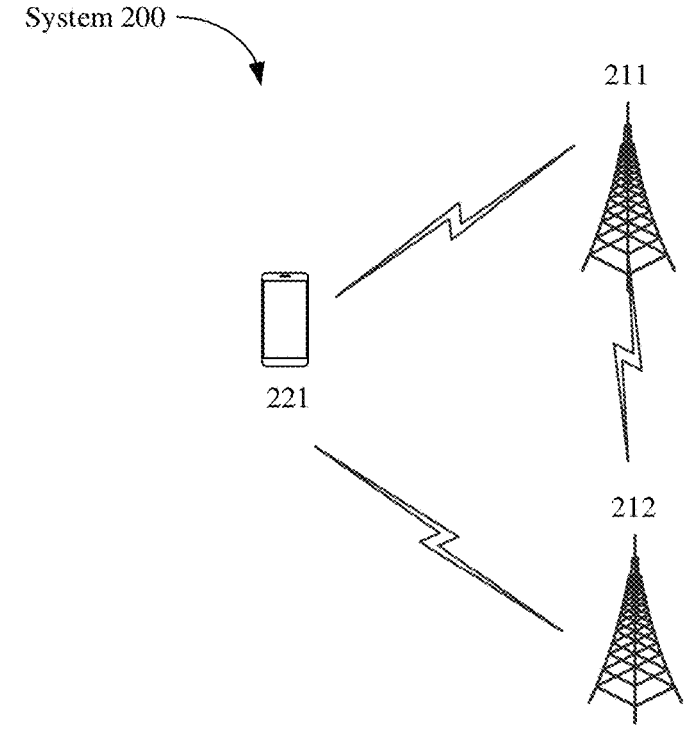
FIG. 2 is a schematic diagram of a wireless communication system 200 according to at least one embodiment.
FIG. 3 is a schematic diagram of a network structure according to at least one embodiment.

FIG. 2 is a schematic diagram of a wireless communication system 200 according to at least one embodiment. As shown in FIG. 2, the wireless communication system 200 includes one terminal device, for example, a terminal device 221 in FIG. 2. The wireless communication system 200 also has a plurality of network devices, for example, a network device 211 and a network device 212 in FIG. 2. The terminal device 221 in FIG. 2 simultaneously communicates with the network device 221 and the network device 212, or the network device 211 and the network device 212 jointly provides a service for the terminal device 221.

In a wireless communication network, for example, a global system for mobile communications (Global system for mobile communications, GSM) and a universal mobile telecommunications system (Universal mobile telecommunications system, UMTS) have advantages of rich service types and strong network control capabilities. However, due to factors such as limited frequency resources and harsh transmission environments, the wireless communication system cannot provide a considerable access rate, and emerging broadband wireless access technologies make up for these disadvantages. The broadband wireless access technologies represented by wireless local area networks (Wireless local area networks, WLAN) and world interoperability for microwave access (World interoperability for microwave access, WiMAX) provides a broadband wireless access service at a high rate, and support nomadic and mobile applications. The access capability of wireless communication is greatly improved. The convergence of a mobile communication network and the broadband wireless access technology is the evolution trend of a telecommunication network in the future.

FIG. 3 is a schematic diagram of a network structure according to at least one embodiment. As shown in FIG. 3, user equipment (User equipment, UE) accesses a network by using a radio access network, and establishes a tunnel between the radio access network and a local serving gateway under control of a mobility management entity. A tunnel is also established between the local serving gateway and a data gateway, so as to establish connectivity between the UE and a packet data network (Packet data networks, PDN). Alternatively, a tunnel is directly established between the UE and a data gateway. The mobility management entity is responsible for managing UE location information, access authentication, non-access stratum signaling, signaling security, and the like. The local serving gateway is a data anchor for small-range movement of the UE, an interface entity between a core network and the radio access network, and is responsible for routing and forwarding of user data. A core control entity records and manages user location information and authentication and authorization information.

A protocol packet transmitted between two endpoint entities of the tunnel is encapsulated by using another protocol, so as to implement secure transmission and routing of data between the two endpoint entities, that is, a tunneling technology.

In order to effectively manage and utilize network resources, a complete network management and control mechanism has been established for the telecommunication network. In response to a terminal exiting the network, the resources allocated to the terminal need to be released in time, including radio channels, bearers, tunnels, and stored information. Some networks support the UE to access one or more packet data services. The packet data service is identified by using an access point name (Access point name, APN). A network side establishes connectivity between a user and a corresponding data gateway based on the APN, and then the data gateway establishes connectivity to a corresponding PDN based on the APN. In this case, the APN of the packet data service that the user needs to access is pre-configured on the network side, or is provided by the user equipment to the network side.

Figure 4:
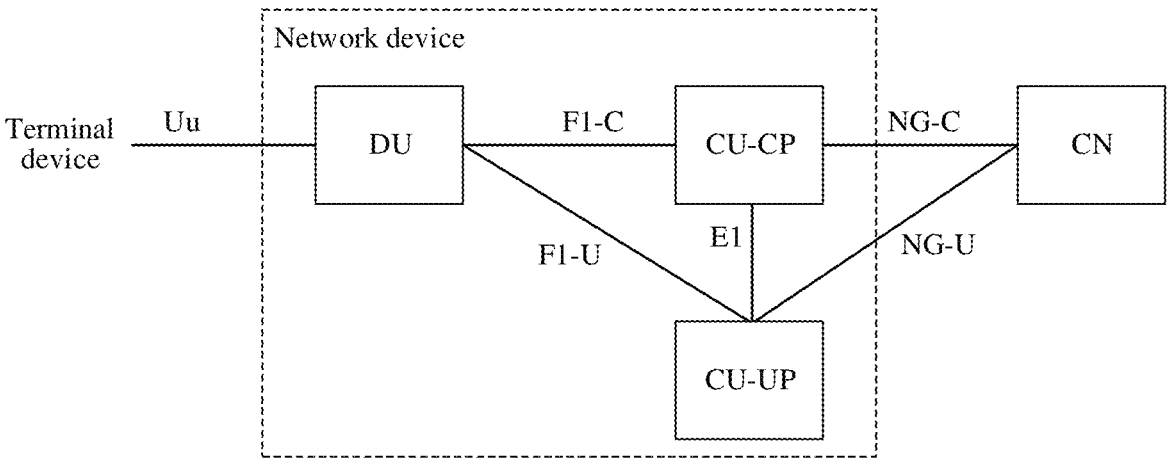
FIG. 4 is a schematic diagram of a wireless access network architecture according to at least one embodiment.

FIG. 4 is a schematic diagram of a wireless access network architecture according to at least one embodiment. As shown in FIG. 4, the network device decouples a central unit (Central unit, CU) from a distributed unit (Distributed unit, DU), so that deployment is more flexible. A wireless access network (wireless access network, RAN) and a core network (Core network, CN) is independently evolved, and the RAN shields impact on the CN due to access termination. In addition, a user plane (CU-UP) and control plane (CU-CP) of the CU are completely decoupled and is deployed in distributed or centralized manner.

FIG. 1 to FIG. 4 are merely examples for description, and embodiments described here are not limited thereto.

In at least one embodiment, both the first cell and the second cell is cells in one network device, for example, both are cells in the network device 111 in FIG. 1. Alternatively, the first cell and the second cell is cells of different network devices. For example, the first cell is the network device 112 in FIG. 2, and the second cell is a cell of the network device 113 in FIG. 2.

The network device in the wireless communication system is any device with a wireless transceiver function. The device includes, but is not limited to: an evolved NodeB (evolved NodeB, eNB), a radio network controller (Radio Network Controller, RNC), a NodeB (NodeB, NB), a base station controller (Base Station Controller, BSC), a base transceiver station (Base Transceiver Station, BTS), a home base station (for example, a Home evolved NodeB, or a Home NodeB, HNB), a base band unit (Base Band Unit, BBU), an access point (Access Point, AP), a wireless relay node, a wireless backhaul node, a transmission point (transmission point, TP), a transmission and reception point (transmission and reception point, TRP), or the like in a wireless fidelity (Wireless Fidelity, WIFI) system, or is a 5G system, such as a gNB or a transmission point (TRP or TP) in an NR system, or one or a group of antenna panels (including a plurality of antenna panels) of a base station in the 5G system, or is a network node that forms a gNB or a transmission point, for example, a baseband unit (BBU), or a distributed unit (distributed unit, DU).

In some deployments, the gNB includes a centralized unit (centralized unit, CU) and a DU. The gNB further includes an active antenna unit (active antenna unit, AAU for short). The CU implements some functions of the gNB, and the DU implements some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU performs some physical layer processing functions, RF processing, and functions related to an active antenna. Because information at the RRC layer is finally changed into information at the PHY layer, or is changed from information at the PHY layer, in this architecture, a higher layer signaling, such as the RRC layer signaling, is also considered to be sent by the DU, or sent by the DU+AAU. The network device is a device including one or more of a CU node, a DU node, and an AAU node. In addition, the CU is divided into a network device in a radio access network (radio access network, RAN), or the CU is divided into a network device in a core network (core network, CN). This is not limited in embodiments described herein.

The terminal device in the wireless communication system is also referred to as user equipment (user equipment, UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in embodiments described herein is a mobile phone (mobile phone), a pad (Pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in at least one embodiment.

For ease of understanding at least one embodiment, several terms used in herein are first briefly described in the following.

1. Cell (Cell)

A cell is described by a higher layer from the perspective of resource management or mobility management or a service unit. A coverage range of each network device is divided into one or more cells, and the cell is considered as including a specific frequency domain resource. The cell is a region within coverage of a wireless network of the network device. In at least one embodiment, different cells corresponds to different network devices. For example, a network device in a cell #1 and a network device in a cell #2 is different network devices, for example, a base station. That is, the cell #1 and the cell #2 is managed by different base stations. In this case, the cell #1 and the cell #2 is referred to as co-site, or a same site. The network device in the cell #1 and the network device in the cell #2 is also different radio frequency processing units of a same base station, for example, a radio remote unit (Radio remote unit, RRU), that is, the cell #1 and the cell #2 is managed by the same base station. The cell #1 and the cell #2 have a same baseband processing unit and intermediate frequency processing unit, but have different radio frequency processing units. This is not specifically limited in embodiments described herein.

In at least one embodiment, the cell #1 is a first cell, and the cell #2 is a second cell.

2. Spectrum Resources

Utilization of the spectrum resources is implemented through time, space, coding, and multiplexing, which is a radio wave order. The utilization of the spectrum resources is to transmit radio waves of a frequency within a specific bandwidth to normally transmit signals without interfering with each other. At the same time, the spectrum resources, abstract natural resources, reflect more of the radio wave order.

3. Control Channel

In a multi-channel shared communication system, a control channel (Control channel, CC) is mainly configured to transmit signaling or synchronization data. In an analog cellular system, page and an access channel are mainly included. In a digital cellular system, a broadcast channel, a common control channel, and a dedicated control channel are mainly included. A downlink channel of the control channel is configured to page (Page), an uplink channel is configured to access (Access), and the control channel is further configured to transmit a large quantity of other data. In each wireless cell, there is usually only one control channel.

4. Resource Block (Resource Block, RB)

In time domain, a minimum resource granularity is one OFDM symbol, and in frequency domain, a minimum granularity is one sub-carrier. One time-frequency resource unit includes one orthogonal frequency division multiplexing (Orthogonal frequency division multiplexing, OFDM) symbol and one sub-carrier, which is referred to as a resource block. During resource mapping at a physical layer, RE is used as a basic unit. 7 OFDM symbols in time domain and 12 consecutive sub-carriers in frequency domain are occupied.

Generally, different wireless networks are divided into independent spectrum resources and do not affect each other. Even in response to a current network load being light, other network services cannot use the spectrum resources, which causes a waste of spectrum resources.

In view of this, embodiments described herein provide a resource sharing method. Based on spectrum resource division between the wireless networks, a new dynamic spectrum sharing mechanism is applied to enable real-time or non-real-time dynamic spectrum sharing between cells of a wireless network. In response to a wireless network being lightly loaded, a spectrum of the wireless network is shared with another wireless network for use, thereby improving user experience and usage efficiency of the spectrum.

To improve utilization efficiency of spectrum resources between wireless networks, at least one embodiment provides the dynamic spectrum sharing mechanism. For example, in response to a network being lightly loaded, the spectrum resources is shared with another network for use, thereby reducing a waste of the spectrum resources. The following uses TDD as an example to define a spectrum sharing mechanism.

(1) Coverage ranges of cells of two networks completely overlap or partially overlap.

(2) Cells of two networks share a consecutive spectrum.

(3) Control channel resources of cells of two networks is statically allocated and staggered. For example: Downlink synchronization signal block (Synchronization signal and PBCH block, SSB)/a channel state information reference signal (CSI-RS), and an uplink physical random access channel (Physical random access channel, PRACH)/a channel sounding reference signal (Sounding reference signal, SRS).

(4) User plane channel resources of cells of two networks is dynamically shared, and a real-time or non-real-time allocation is implemented through negotiation between the two cells (for example, transmission time interval (transmission time interval, TTI) level).

Figure 5:
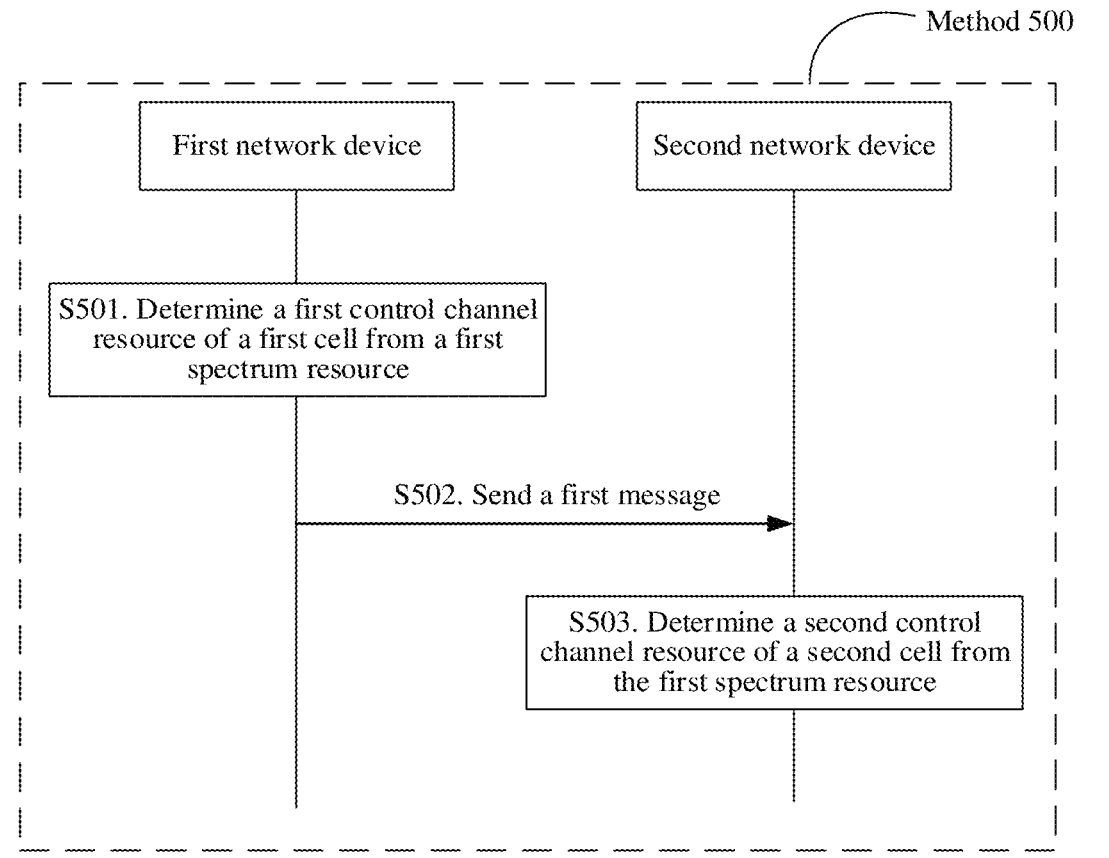

FIG. 5 is a schematic diagram of a resource sharing method 500 according to at least one embodiment. As shown in FIG. 5, the method includes the following steps:

S501. A first network device determines a first control channel resource of a first cell from a first spectrum resource.

For example, the first network device determines the first control channel resource of the first cell from the first spectrum resource, where the first cell belongs to the first network device.

Specifically, the first network device determines the first control channel resource of the first cell from the first spectrum resource, where the first cell belongs to the first network device. Further, the first network device determines the first control channel resource of the first cell according to a first control channel resource allocation principle.

In a possible implementation, the first network device allocates from a start part of the first spectrum resource. In other words, the first network device determines that a spectrum resource in the start part of the first spectrum resource is a start control channel resource of the first control channel resource.

Figure 6:
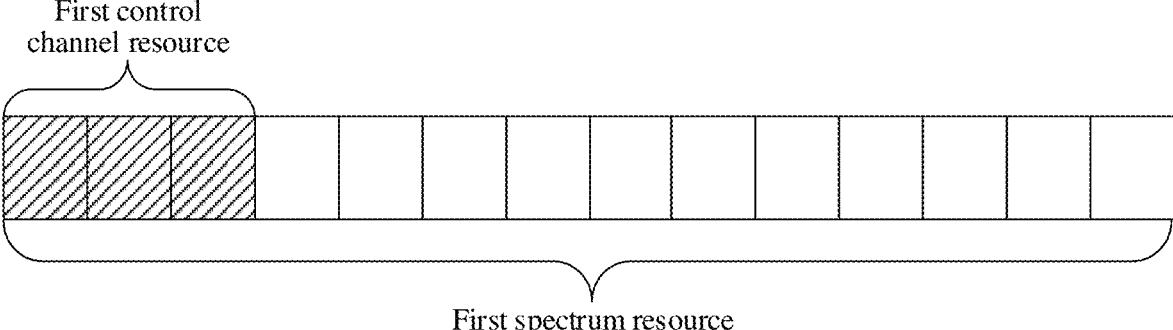
FIG. 6 is a schematic diagram of allocating a first control channel resource according to at least one embodiment.
Figure 7:
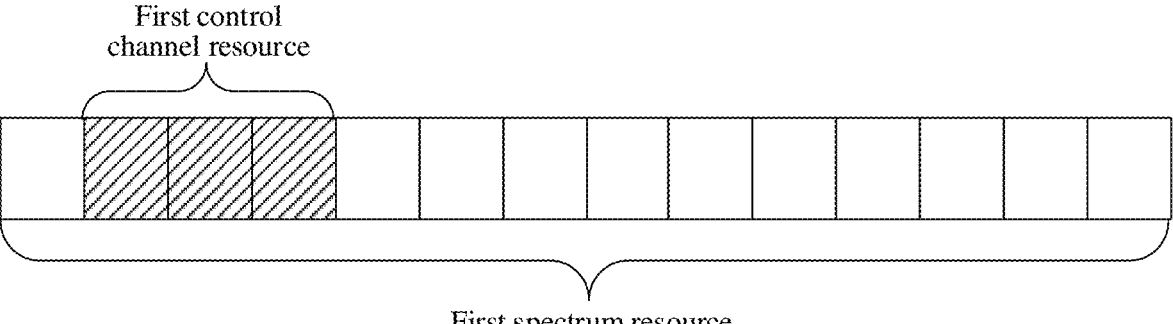
FIG. 7 is another schematic diagram of allocating a first control channel resource according to at least one embodiment.

For example, FIG. 6 is a schematic diagram of allocating a first control channel resource according to at least one embodiment. As shown in FIG. 6, the first network device determines that a start spectrum resource of the first spectrum resource is the start control channel resource of the first control channel resource. FIG. 7 is another schematic diagram of allocating a first control channel resource according to at least one embodiment. As shown in FIG. 7, the first network device determines a spectrum resource that is of the first spectrum resource and that is close to the start spectrum resource, for example, a second spectrum resource of the first spectrum resource, as the start control channel resource of the first control channel resource.

In another possible implementation, the first network device allocates starting from an end part of the first spectrum resource. In other words, the network device determines that a spectrum resource in the end part of the first spectrum resource is a start control channel resource of the first control channel resource.

Figure 8:
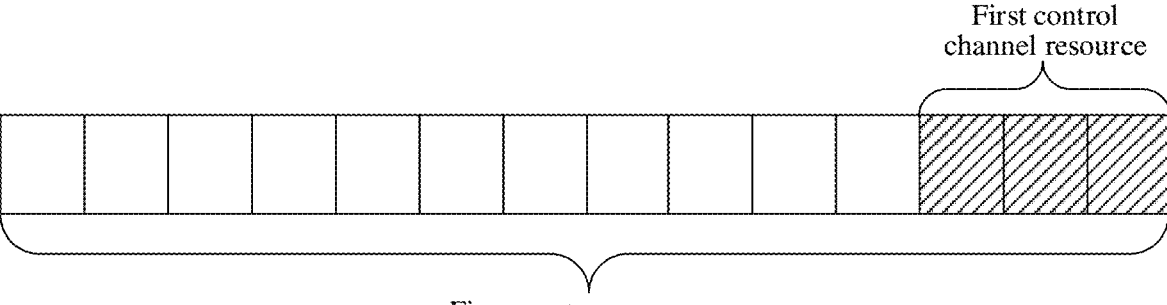
FIG. 8 is another schematic diagram of allocating a first control channel resource according to at least one embodiment.

For example, FIG. 8 is another schematic diagram of allocating a first control channel resource according to at least one embodiment. As shown in FIG. 8, the first network device determines that an end spectrum resource of the first spectrum resource is a start control channel resource of the first control channel resource. FIG. 9 is another schematic diagram of allocating a first control channel resource according to at least one embodiment. As shown in FIG. 9, a first network device determines a spectrum resource that is of the first spectrum resource and that is close to the end spectrum resource, for example, a second spectrum resource at the end of the first spectrum resource as the start control channel resource of the first control channel resource.

In another possible implementation, the first network device determines that an intermediate spectrum resource of the first spectrum resource is the start control channel resource of the first control channel resource.

For example, FIG. 10 is another schematic diagram of allocating a first control channel resource according to at least one embodiment. As shown in FIG. 10, the first network device determines that an intermediate spectrum resource of the first spectrum resource is a start control channel resource of the first control channel resource.

In the foregoing first control channel resource allocation principle, the start spectrum resource of the first spectrum resource is the start control channel resource of the first control channel resource.

S502. The first network device sends a first message to a second network device.

For example, the first network device sends the first message to the second network device, where the first message indicates the second network device to allocate a second control channel resource to a second cell from the first spectrum resource, the second cell belongs to the second network device, the first control channel resource and the second control channel resource belong to different parts of the first spectrum resource, and the first spectrum resource is a spectrum resource shared by the first cell and the second cell.

Specifically, after determining the first control channel resource of the first cell, the first network device sends the first message to the second network device, so that the second network device uses a spectrum resource other than the first control channel resource in the first spectrum resource, that is, allocate a second control channel resource to the second cell belonging to the second network device. Further, the first message includes at least one of the following information: identification information of the first cell, information about the first control channel resource, uplink initial BWP information of the first cell, downlink initial BWP information of the first cell, SSB configuration information of the first cell, and identification information of the second cell. The SSB configuration information of the first cell is SSB spectrum location information of the first cell.

S503. The second network device determines a second control channel resource of a second cell from the first spectrum resource.

For example, after receiving the first message sent by the first network device, the second network device allocates the second control channel resource to the second cell.

Specifically, after receiving the first message, the second network device allocates the second control channel resource to the second cell based on the first message. Further, the second network device determines the second control channel resource according to a second control channel resource allocation principle.

In a possible implementation, in response to the start control channel resource of the first control channel resource being the start spectrum resource of the first spectrum resource, the second network device determines that the end spectrum resource of the first spectrum resource is the start control channel resource of the second control channel resource.

Figure 12:
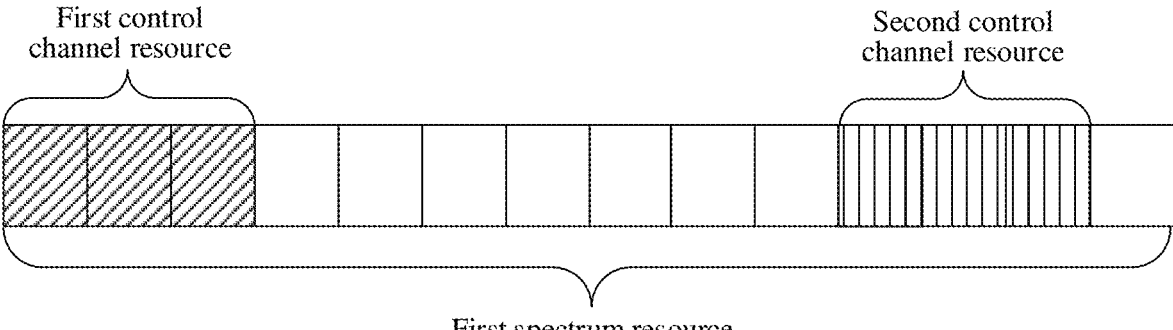
FIG. 12 is another schematic diagram of allocating a second control channel resource according to at least one embodiment.

For example, FIG. 11 is a schematic diagram of allocating a second control channel resource according to at least one embodiment. As shown in FIG. 11, in response to a start control channel resource of a first control channel resource being a start spectrum resource of a first spectrum resource, the second network device determines that an end spectrum resource of the first spectrum resource is a start control channel resource of the second control channel resource. FIG. 12 is another schematic diagram of allocating a second control channel resource according to at least one embodiment. As shown in FIG. 12, in response to a start control channel resource of a first control channel resource being a start spectrum resource of a first spectrum resource, the second network device determines a spectrum resource that is of the first spectrum resource and that is close to an end spectrum resource, that is, determine an end second spectrum resource of the first spectrum resource as a start control channel resource of the second control channel resource.

In another possible implementation, in response to the start control channel resource of the first control channel resource being an end spectrum resource of the first spectrum resource, the second network device allocates from the start part of the first spectrum resource, that is, determine that the spectrum resource of the start part of the first spectrum resource is the start control channel resource of the first control channel resource.

Figure 13:
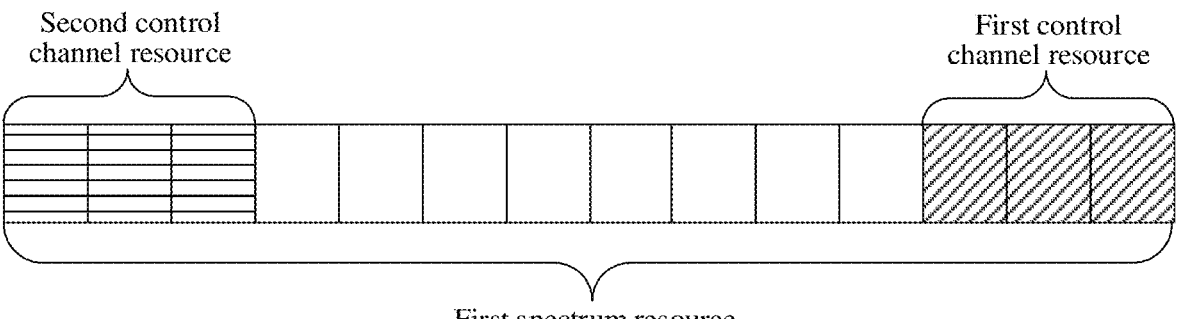
FIG. 13 is another schematic diagram of allocating a second control channel resource according to at least one embodiment.
Figure 14:
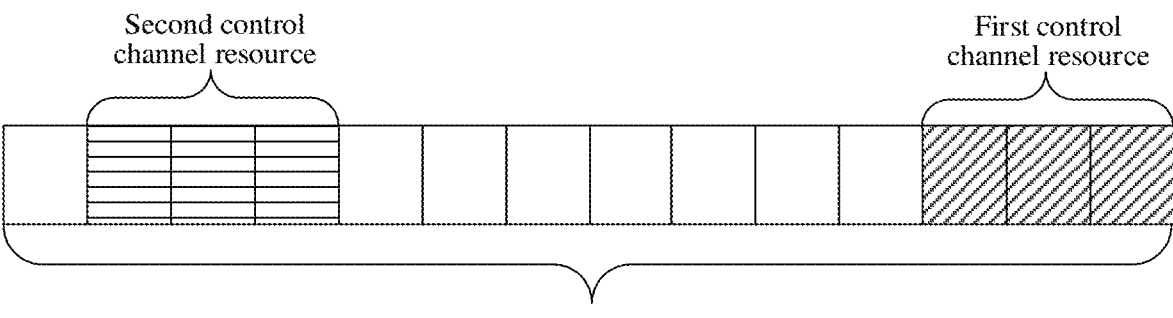
FIG. 14 is another schematic diagram of allocating a second control channel resource according to at least one embodiment.

For example, FIG. 13 is another schematic diagram of allocating a second control channel resource according to at least one embodiment. As shown in FIG. 13, in response to a start control channel resource of a first control channel resource being an end spectrum resource of the first spectrum resource, the second network device determines that a start spectrum resource of the first spectrum resource is a start control channel resource of the first spectrum resource. FIG. 14 is another schematic diagram of allocating a second control channel resource according to at least one embodiment. As shown in FIG. 14, in response to a start control channel resource of a first control channel resource being an end spectrum resource of a first spectrum resource, the second network device determines a spectrum resource that is of the first spectrum resource and that is close to a start spectrum resource, for example, determine a start second spectrum resource of the first spectrum resource as a start control channel resource of the second control channel resource.

In another possible implementation, the second network device determines that an intermediate spectrum resource of the first spectrum resource is the start control channel resource of the second control channel resource.

Figure 15:
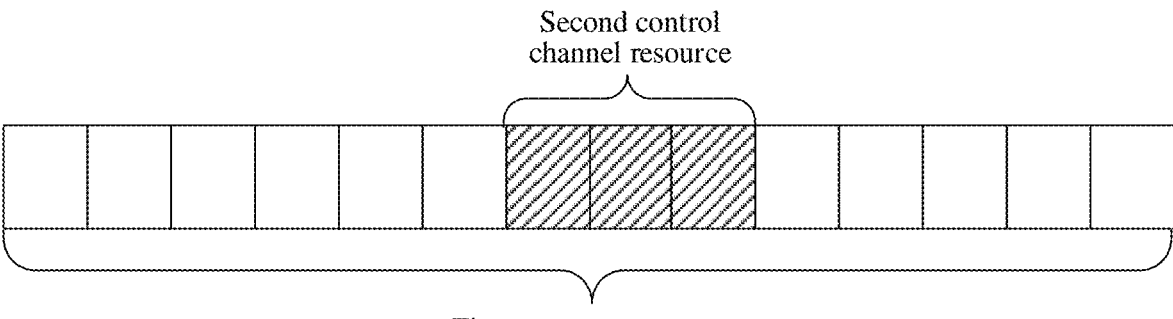
FIG. 15 is another schematic diagram of allocating a second control channel resource according to at least one embodiment.

For example, FIG. 15 is another schematic diagram of allocating a second control channel resource according to at least one embodiment. As shown in FIG. 15, the second network device determines that the intermediate spectrum resource of the first spectrum resource is the start control channel resource of the second control channel resource.

In the foregoing second control channel resource allocation principle, in response to the start control channel resource of the first control channel resource being the start spectrum resource of the first spectrum resource, the end spectrum resource of the second spectrum resource is the start control channel resource of the second control channel resource.

Based on the foregoing solution, a dynamic spectrum sharing mechanism is applied, an Xn interface defines a new message and a new cell, supports dynamic negotiation of spectrum sharing between cells, enables dynamic spectrum sharing between cells in a wireless network, and ensures that control channel resources between cells do not overlap on a shared spectrum resource. In response to a wireless network being lightly loaded, a spectrum of the wireless network is shared with another wireless network for use, thereby improving user experience and utilization efficiency of spectrum resources.

Figure 16:
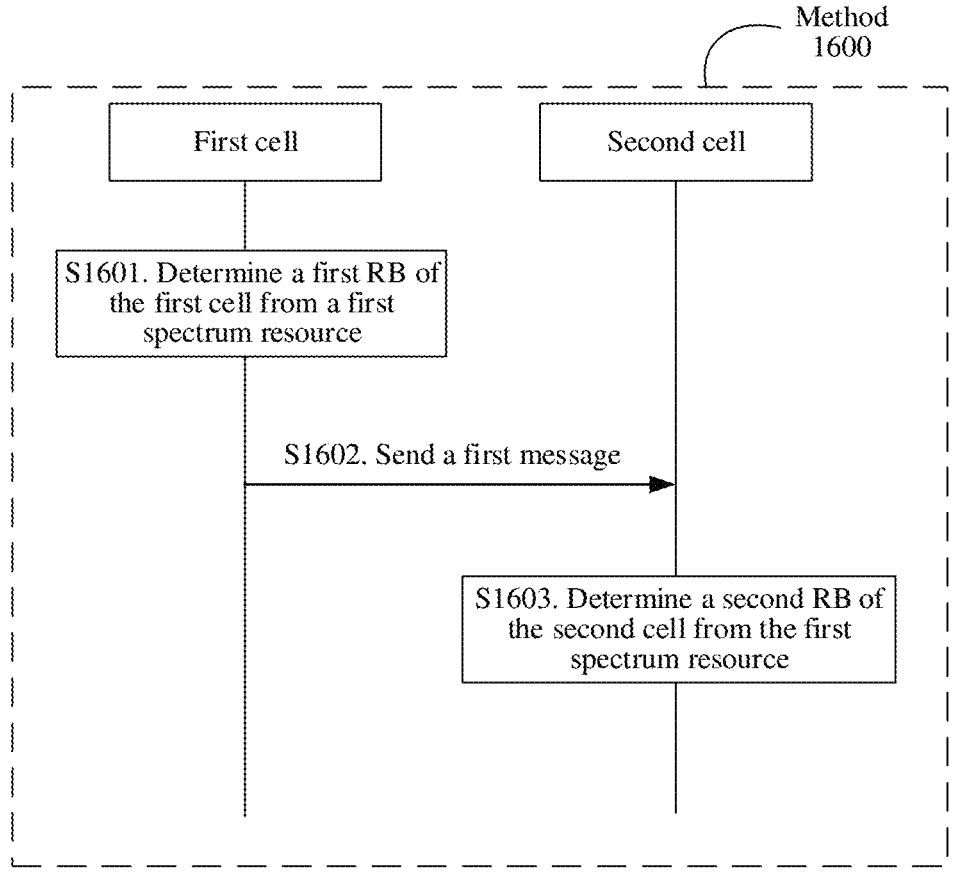
FIG. 16 is a schematic diagram of a resource sharing method 1600 according to at least one embodiment.

FIG. 16 is a schematic diagram of a resource sharing method 1600 according to at least one embodiment. As shown in FIG. 16, the method includes the following steps:

S1601. A first network device determines a first RB of a first cell from a first spectrum resource.

For example, the first network device determines the first RB of the first cell from the first spectrum resource, where the first cell belongs to the first network device. Further, in the first spectrum resource, in response to a control plane resource or a reserved control plane resource being sufficient, the first network device determines the first RB in a remaining first spectrum resource, that is, a user plane resource allocation area.

Specifically, the first network device determines the first RB from the first spectrum resource for the first cell, where the first cell belongs to the first network device. Further, the first network device determines the first RB of the first cell according to a first RB allocation principle.

In a possible implementation, the first network device allocates from a start part of the first spectrum resource. In other words, the first network device determines that a spectrum resource in the start part of the first spectrum resource is a start RB of the first RB.

Figure 17:
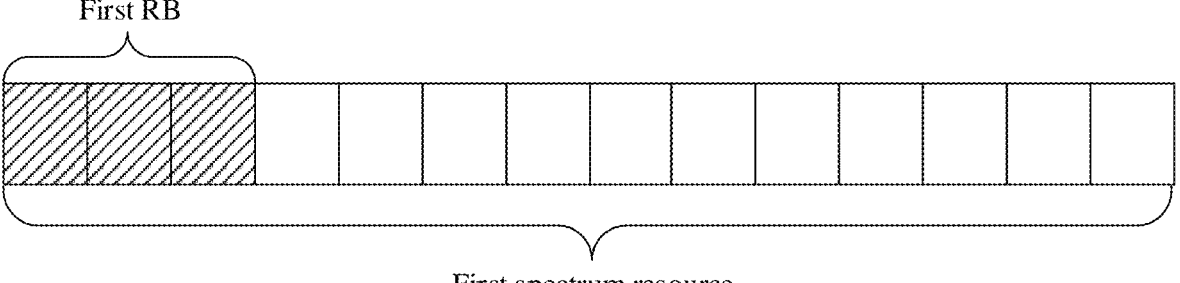
FIG. 17 is a schematic diagram of allocating a first RB according to at least one embodiment.
Figure 18:
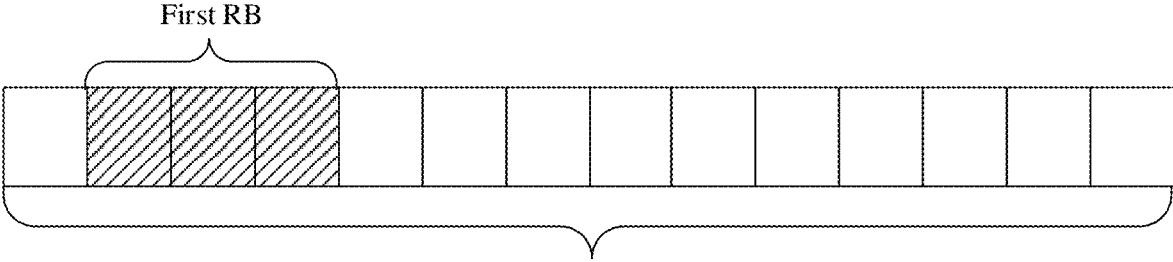
FIG. 18 is another schematic diagram of allocating a first RB according to at least one embodiment.

For example, FIG. 17 is a schematic diagram of allocating a first RB according to at least one embodiment. As shown in FIG. 17, the first network device determines that the start spectrum resource of the first spectrum resource is the start RB of the first RB. FIG. 18 is another schematic diagram of allocating a first RB according to at least one embodiment. As shown in FIG. 18, the first network device determines a spectrum resource that is of a first spectrum resource and that is close to a start spectrum resource, for example, determine a second spectrum resource that is of the first spectrum resource and that is close to the start spectrum resource as a start RB of the first RB.

In another possible implementation, the first network device allocates from an end part of the first spectrum resource, that is, determine that the spectrum resource in the end part of the first spectrum resource is the start RB of the first RB.

Figure 19:
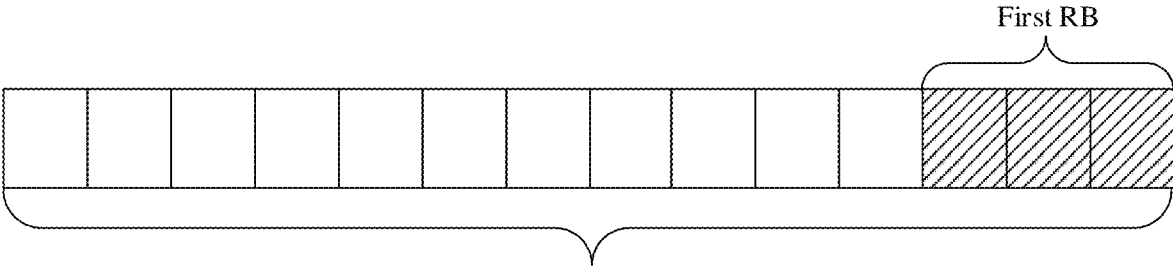
FIG. 19 is another schematic diagram of allocating a first RB according to at least one embodiment.
Figure 20:
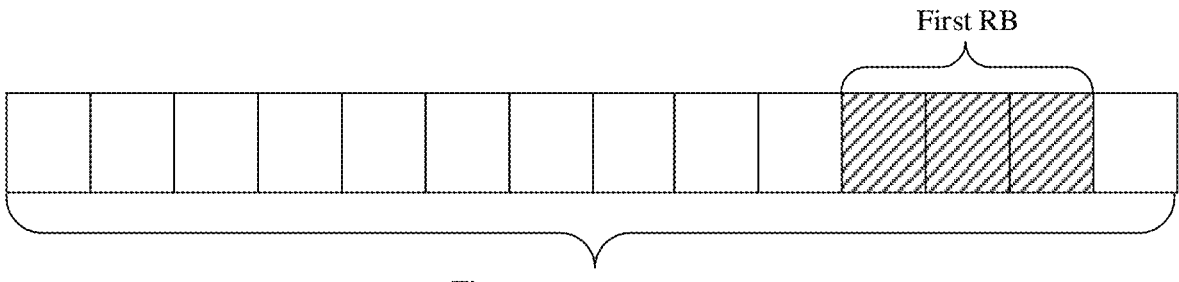
FIG. 20 is another schematic diagram of allocating a first RB according to at least one embodiment.

For example, FIG. 19 is another schematic diagram of allocating a first RB according to at least one embodiment. As shown in FIG. 19, the first network device determines that an end spectrum resource of a first spectrum resource is a start RB of the first RB. FIG. 20 is another schematic diagram of allocating a first RB according to at least one embodiment. As shown in FIG. a first network device determines a spectrum resource that is of a first spectrum resource and that is close to an end spectrum resource, for example, determine a second spectrum resource that is of the first spectrum resource and that is close to the end spectrum resource as a start RB of the first RB.

In another possible implementation, the first network device determines that an intermediate spectrum resource of the first spectrum resource is the start RB of the first RB.

Figure 21:
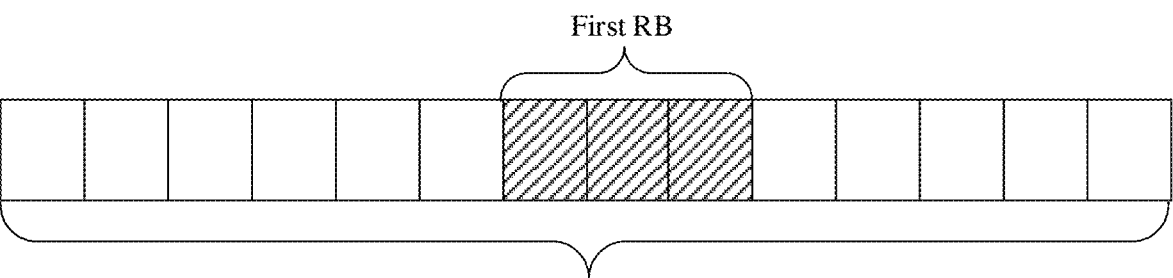
FIG. 21 is another schematic diagram of allocating a first RB according to at least one embodiment.

For example, FIG. 21 is another schematic diagram of allocating a first RB according to at least one embodiment. As shown in FIG. 21, the first network device determines that an intermediate spectrum resource of a first spectrum resource is a start RB of the first RB.

In the foregoing first RB allocation principle, the start spectrum resource of the first spectrum resource is the start RB of the first RB.

S1602. The first network device sends a first message to a second network device.

For example, the first network device sends the first message to the second network device, where the first message indicates the second network device to allocate a second RB to a second cell from the first spectrum resource, the second cell belongs to the second network device, the first RB and the second RB belong to different parts of the first spectrum resource, and the first spectrum resource is a spectrum resource shared by the first cell and the second cell.

Specifically, the first network device sends the first message to the second network device, so that the second network device allocates the second RB to the second cell from the first spectrum resource. Further, the first message includes at least one of the following information: at least one of information about the first spectrum resource other than the first RB in the first spectrum resource and identification information of the second cell.

S1603. The second network device determines a second RB of a second cell from the first spectrum resource.

For example, the second network device determines the second RB of the second cell from the first spectrum resource based on information included in the first message. Further, in the first spectrum resource, in response to a control plane resource or a reserved control plane resource being sufficient, the second network device determines the second RB in a remaining first spectrum resource, that is, a user plane resource allocation area.

Specifically, the second network device determines the second RB from the first spectrum resource for the second cell, where the second cell belongs to the second network device. Further, the first network device determines the second RB of the second cell based on the second RB allocation principle.

In a possible implementation, in response to the start RB of the first RB being the start spectrum resource of the first spectrum resource, the second network device allocates from the end part of the first spectrum resource, that is, determine that the spectrum resource in the end part of the first spectrum resource is the start RB of the second RB.

Figure 22:
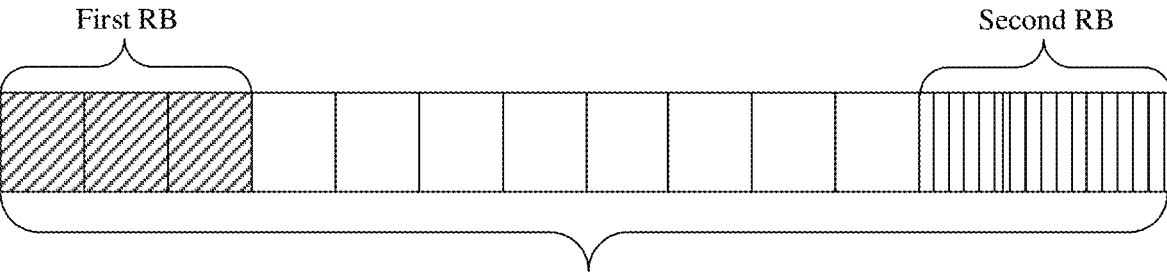
FIG. 22 is a schematic diagram of allocating a second RB according to at least one embodiment.
Figure 23:
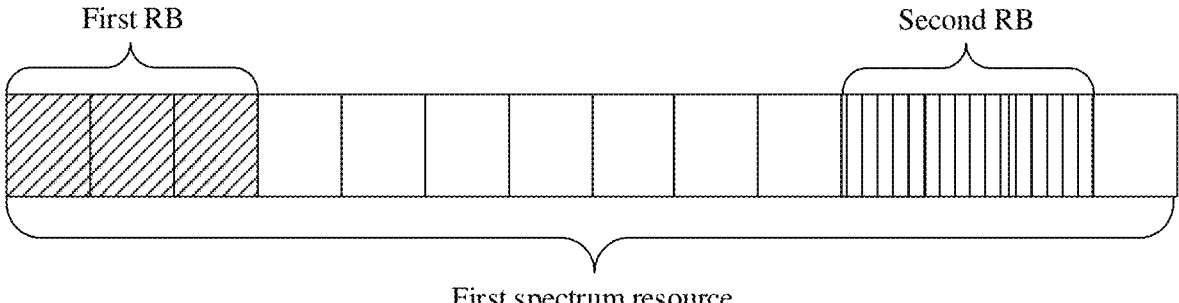
FIG. 23 is another schematic diagram of allocating a second RB according to at least one embodiment.

For example, FIG. 22 is a schematic diagram of allocating a second RB according to at least one embodiment. As shown in FIG. 22, in response to a start RB of a first RB being a start spectrum resource of a first spectrum resource, the second network device determines that an end spectrum resource of the first spectrum resource is a start RB of the second RB. FIG. 23 is another schematic diagram of allocating a second RB according to at least one embodiment. As shown in FIG. 23, a second network device determines a spectrum resource that is of a first spectrum resource and that is close to an end spectrum resource, for example, determine a second spectrum resource that is of the first spectrum resource and that is close to the end spectrum resource as a start RB of the second RB.

In another possible implementation, in response to the start RB of the first RB being the end spectrum resource of the first spectrum resource, the second network device allocates from the start part of the first spectrum resource, that is, determine that the spectrum resource in the start part of the first spectrum resource is the start RB of the second RB.

Figure 24:
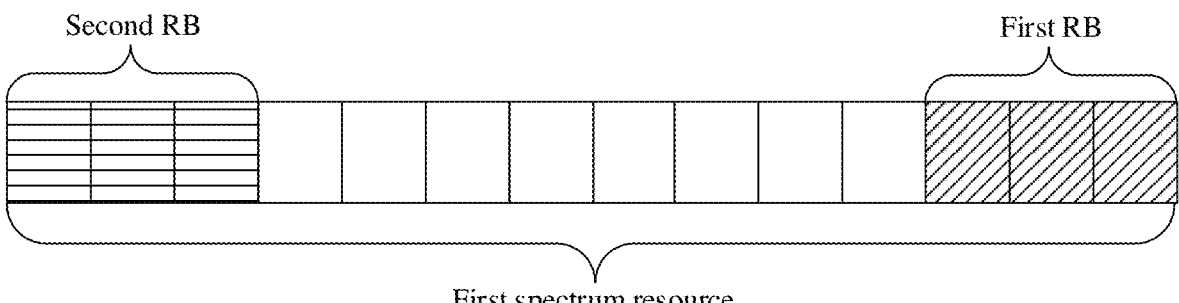
FIG. 24 is another schematic diagram of allocating a second RB according to at least one embodiment.
Figure 25:
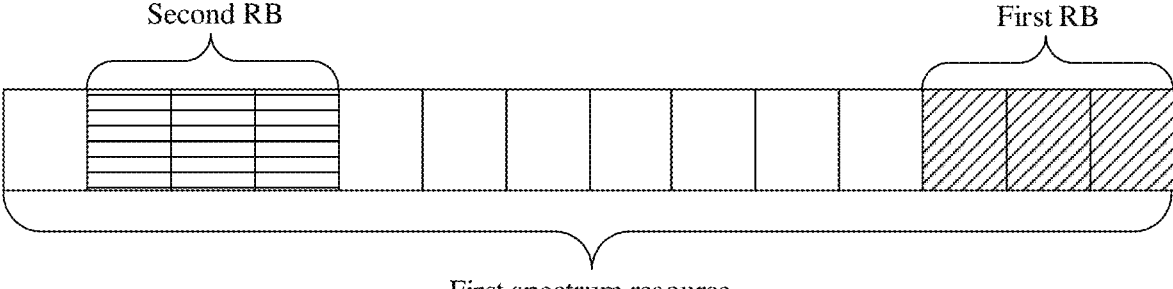
FIG. 25 is another schematic diagram of allocating a second RB according to at least one embodiment.

For example, FIG. 24 is another schematic diagram of allocating a second RB according to at least one embodiment. As shown in FIG. 24, in response to a start RB of a first RB being a start spectrum resource of a first spectrum resource, the second network device determines that the start spectrum resource of the first spectrum resource is a start RB of the second RB. FIG. 25 is another schematic diagram of allocating a second RB according to at least one embodiment. As shown in FIG. 25, in response to a start RB of a first RB being a start spectrum resource of a first spectrum resource, a second network device determines an RB that is of the first spectrum resource and that is close to the start RB, for example, determine that a second spectrum resource that is of the first spectrum resource and that is close to the start spectrum resource is the start RB of the second RB.

In another possible implementation, the second network device determines that an intermediate spectrum resource of the first spectrum resource is the start RB of the second RB.

Figure 26:
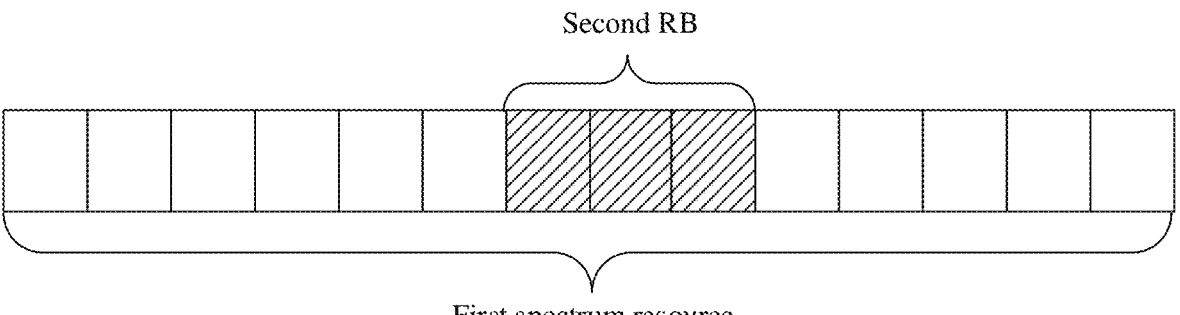
FIG. 26 is another schematic diagram of allocating a second RB according to at least one embodiment.

For example, FIG. 26 is another schematic diagram of allocating a second RB according to at least one embodiment. As shown in FIG. 26, the second network device determines that the intermediate spectrum resource of the first spectrum resource is the start RB of the second RB.

In the foregoing second RB allocation principle, in response to the start RB of the first RB is the start spectrum resource of the first spectrum resource, the end spectrum resource of the first spectrum resource is the start RB of the second RB.

Based on the foregoing solution, a new function, that is, a service traffic prediction function, is defined, and supports service traffic prediction of a cell. A new message and a new cell of the Xn interface are defined between the network device and the TPF entity. By applying a dynamic spectrum sharing mechanism, a new message and a new cell are defined, dynamic negotiation of spectrum sharing between cells is supported, dynamic spectrum sharing is enabled between cells in a wireless network, RB allocation of two cells is supported, and RBs between two cells do not overlap on a shared spectrum resource are ensured. In response to a wireless network is lightly loaded, a spectrum of the wireless network is shared with another wireless network for use, thereby improving user experience and usage efficiency of spectrum resources.

Figure 27:
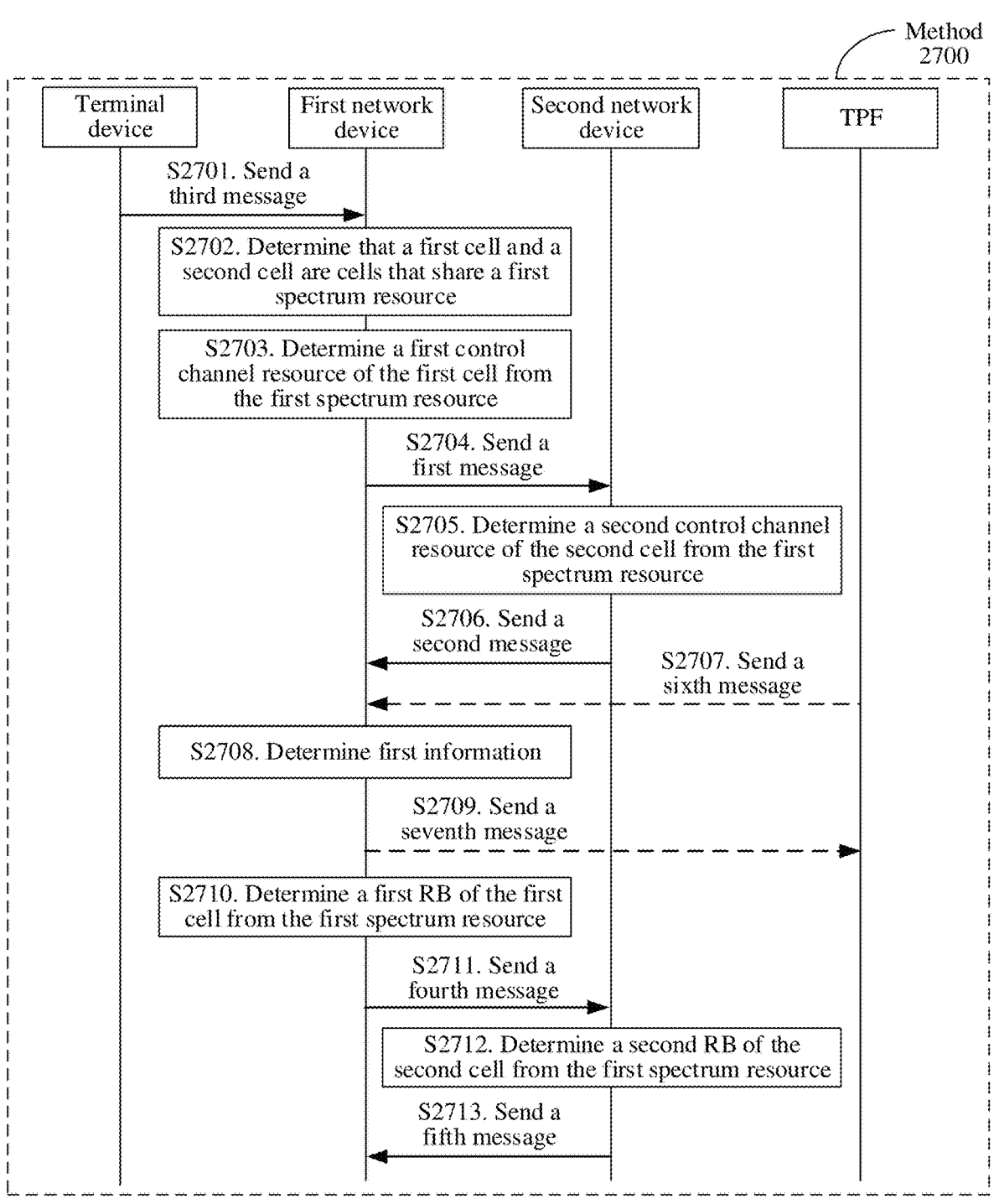
FIG. 27 is a schematic diagram of a resource sharing method 2700 according to at least one embodiment.

FIG. 27 is a schematic diagram of a resource sharing method 2700 according to at least one embodiment. As shown in FIG. 27, the method includes the following steps:

S2701. A terminal device sends a third message to a first network device.

For example, the terminal device sends the third message to the first network device, where the third message includes at least one of information about reference signal received power and information about reference signal received quality of the second network device.

S2702. The first network device determines that a first cell and a second cell are cells that share a first spectrum resource.

For example, the first network device determines, based on the third message, that the first cell and the second cell are cells that share the first spectrum resource. The first cell belongs to the first network device, and the second cell belongs to the second network device.

Specifically, the first network device determines, according to a preset condition, whether the first cell and the second cell are cells that share the first spectrum resource. Further, the preset condition includes at least one of the following conditions: a coverage range of the first cell and a coverage range of the second cell at least partially overlap, and the first cell and the second cell are capable of sharing a spectrum resource. That the coverage range of the first cell and the coverage range of the second cell at least partially overlap includes that the first cell overlaps only partially with the second cell, or includes that the coverage range of the first cell completely covers the coverage range of the second cell. This is not limited in embodiments described herein.

S2703. The first network device determines a first control channel resource of the first cell from the first spectrum resource.

For example, the first network device determines the first control channel resource of the first cell from the first spectrum resource.

Specifically, for the related description that the first network device determines the first control channel resource of the first cell in the first spectrum resource, refer to the description in S501 that the first network device determines the first control channel resource of the first cell from the first spectrum resource. For brevity, details are not described in embodiments described herein.

S2704. The first network device sends a first message to a second network device.

For example, the first network device sends the first message to the second network device, where the first message indicates the second network device to allocate a second control channel resource to the second cell from the first spectrum resource, the first control channel resource and the second control channel resource belong to different parts of the first spectrum resource, and the first spectrum resource is a spectrum resource shared by the first cell and the second cell.

Specifically, for the related description that the first network device sends the first message to the second network device, refer to the description in S502 that the first network device sends the first message to the second network device. For brevity, details are not described in embodiments described herein.

S2705. The second network determines a second control channel resource of the second cell from the first spectrum resource.

For example, after receiving the first message sent by the first network device, the second network device allocates the second control channel resource to the second cell.

Specifically, for the description that the second network determines the second control channel resource of the second cell from the first spectrum resource, refer to the related description in S503 that the second network determines the second control channel resource of the second cell from the first spectrum resource. For brevity, details are not described further in embodiments described herein.

S2706. The second network device sends a second message to the first network device.

For example, the second network device sends the second message to the first network device, where the second message includes at least one of the following information: uplink initial BWP information of the second cell, downlink initial BWP information of the second cell, SSB configuration information of the second cell, and information about the second control channel resource.

S2707. A TPF entity sends a sixth message to the first network device.

Optionally, the TPF entity sends the sixth message to the first network device, where the sixth message includes first information, and the first information includes information about predicted telephone traffic or information about predicted service traffic of the first cell. The telephone traffic of the first cell is short for telecommunication service traffic, and is also referred to as telecommunication load. The telecommunication load represents both the load on a telecommunication equipment and the degree of a communication usage of the user. The service traffic of the first cell is a load amount of all information transmitted in a communication system or a communication network.

Optionally, the first information is at least one type of the following information: a service traffic of the first network device in a next TTI at a current TTI, a service traffic of the first network device in a plurality of future TTIs at a current TTI, an average service traffic of the first network device in a next period at a current TTI, a maximum service traffic of the first network device in a next period at a current TTI, or a minimum service traffic of the first network device in a next period at a current TTI.

S2708. The first network device determines first information.

For example, the first network device determines the first information based on the sixth message.

S2709. The first network device sends a seventh message to the TPF entity.

Optionally, after determining the first information, the first network device sends the seventh message to the TPF entity, where the seventh message indicates that the first network device has received the sixth message.

In response to the first network device including a function of the TPF entity, S2707 and S2709 is omitted, and the first network device independently determines the first information.

S2710. The first network device determines a first RB of the first cell from the first spectrum resource.

Figure 28:
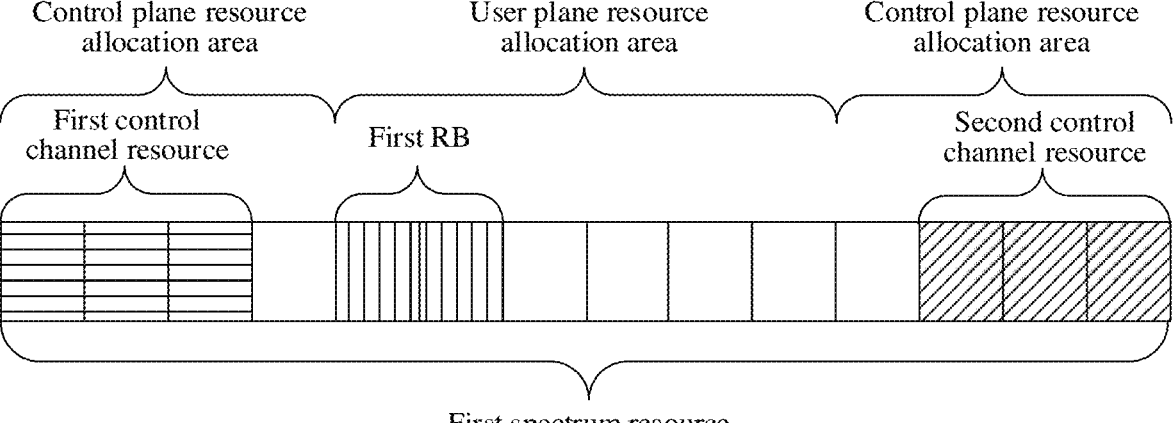
FIG. 28 is another schematic diagram of allocating a first RB according to at least one embodiment.

For example, the first network device determines the first RB of the first cell from the first spectrum resource. In the first spectrum resource, in response to a control plane resource or a reserved control plane resource being sufficient, the first network device determines the first RB in a user plane resource allocation area. For example, FIG. 28 is another schematic diagram of allocating a first RB according to at least one embodiment. As shown in FIG. 28, the first control channel resource, the second control channel resource, and the first RB belong to different parts of the first spectrum resource, and there is no overlap.

Specifically, for the description that the first network device determines the first RB of the first cell from the first spectrum resource, refer to the description in S1601 that the first network device determines the first RB of the first cell from the first spectrum resource. For brevity, details are not described embodiments provided herein.

S2711. The first network device sends a fourth message to the second network device.

For example, after determining the first RB of the first cell, the first network device sends the fourth message to the second network device, where the fourth message indicates the second network device to allocate a second RB to the second cell from the first spectrum resource, the first RB and the second RB belong to different parts of the first spectrum resource, and the first spectrum resource is a spectrum resource shared by the first cell and the second cell.

Specifically, for the description of the fourth message, refer to the related description of the first message in S1602. For brevity, details are not described in embodiments provided herein.

S2712. The second network device determines a second RB of the second cell from the first spectrum resource.

Figure 29:
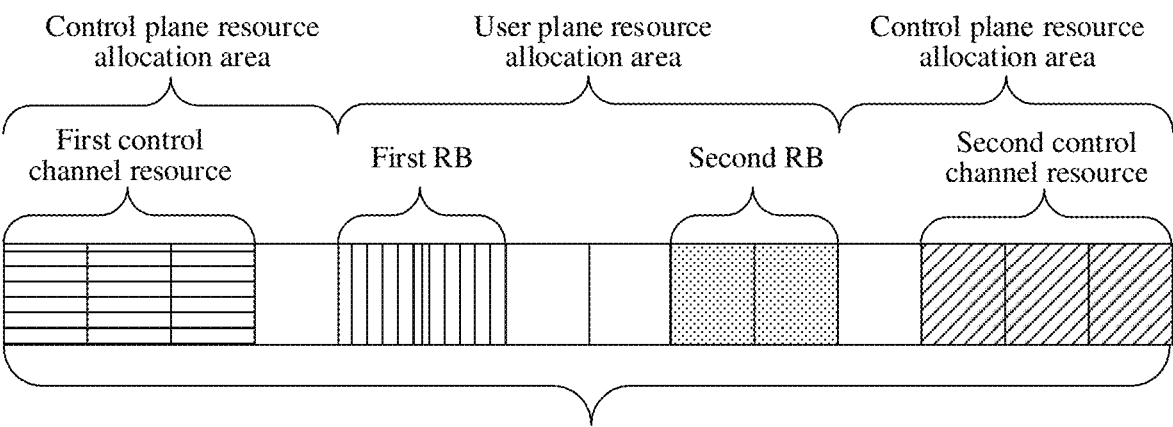
FIG. 29 is another schematic diagram of allocating a second RB according to at least one embodiment.

For example, the second network device determines the second RB of the second cell based on information included in the fourth message. In the first spectrum resource, in response to a control plane resource or a reserved control plane resource being sufficient, the second network device determines the second RB in a user plane resource allocation area. For example, FIG. 29 is another schematic diagram of allocating a second RB according to at least one embodiment. As shown in FIG. 29, the first control channel resource, the second control channel resource, the first RB, and the second RB belong to different parts of the first spectrum resource, and there is no overlap.

Specifically, for the description that the second network device determines the second RB of the second cell, refer to the related description in S1603 that the second network device determines the second RB. For brevity, details are not described in embodiments provided herein.

S2713. The second network device sends a fifth message to the first network device.

For example, the second network device sends the fifth message to the first network device, and the fifth message includes information about the second RB of the second cell.

Based on the foregoing solution, a dynamic spectrum sharing mechanism is applied, an Xn interface defines a new message and a new cell, supports dynamic negotiation of spectrum sharing between cells, enables dynamic spectrum sharing between cells in a wireless network, supports allocation of control channel resources and RBs between two cells, and ensures that the control channel resources and the RBs between cells do not overlap on a shared spectrum resource. Define a new function, that is, a service traffic prediction function. The service traffic prediction of a cell is supported by defining a new interface, a new message, and a new cell between the network device and the TPF entity. In response to a wireless network being lightly loaded, a spectrum of the wireless network is shared with another wireless network for use, thereby improving user experience and usage efficiency of spectrum resources.

Figure 30A:
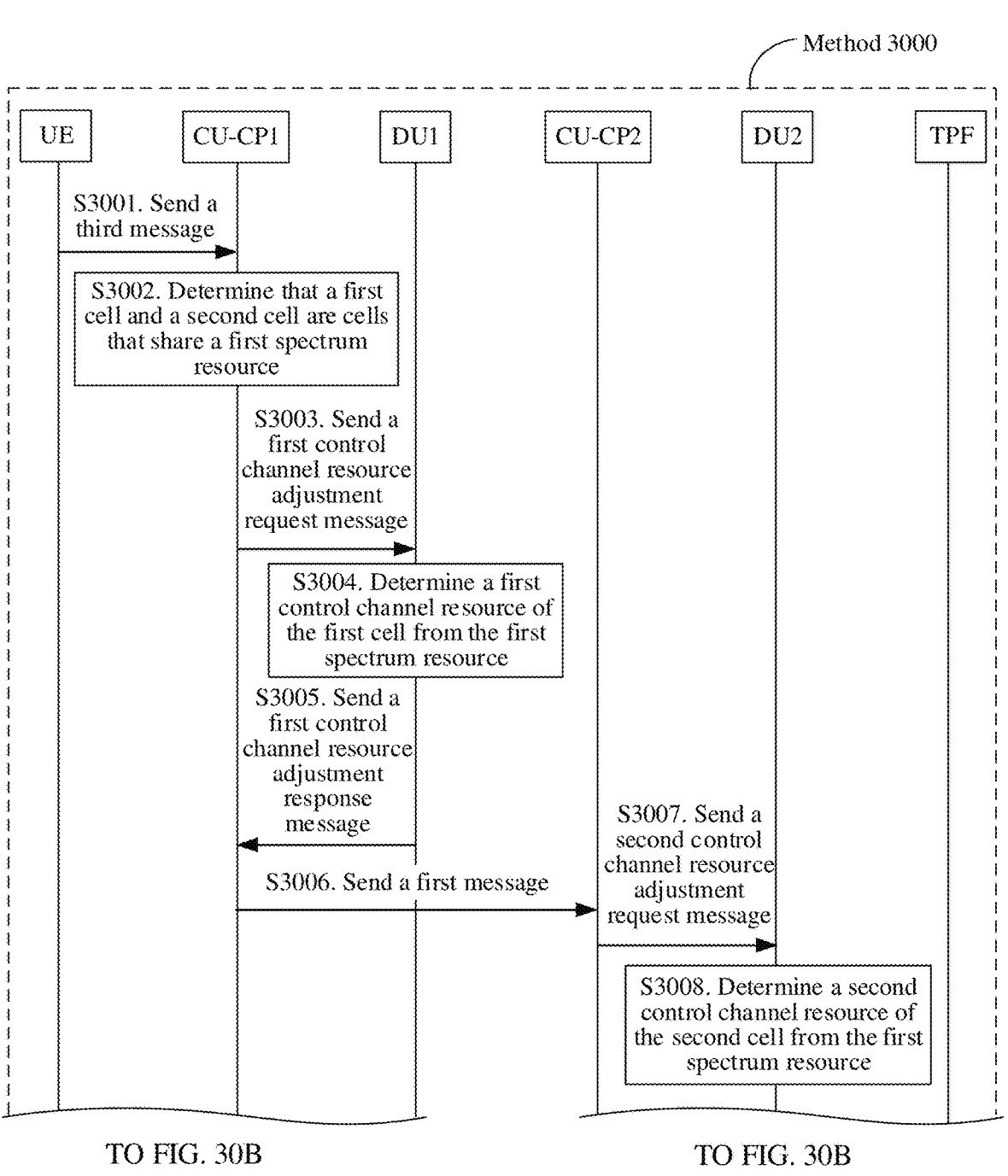
FIG. 30A and FIG. 30B are schematic diagrams of a resource sharing method 3000 according to at least one embodiment.
Figure 30B:
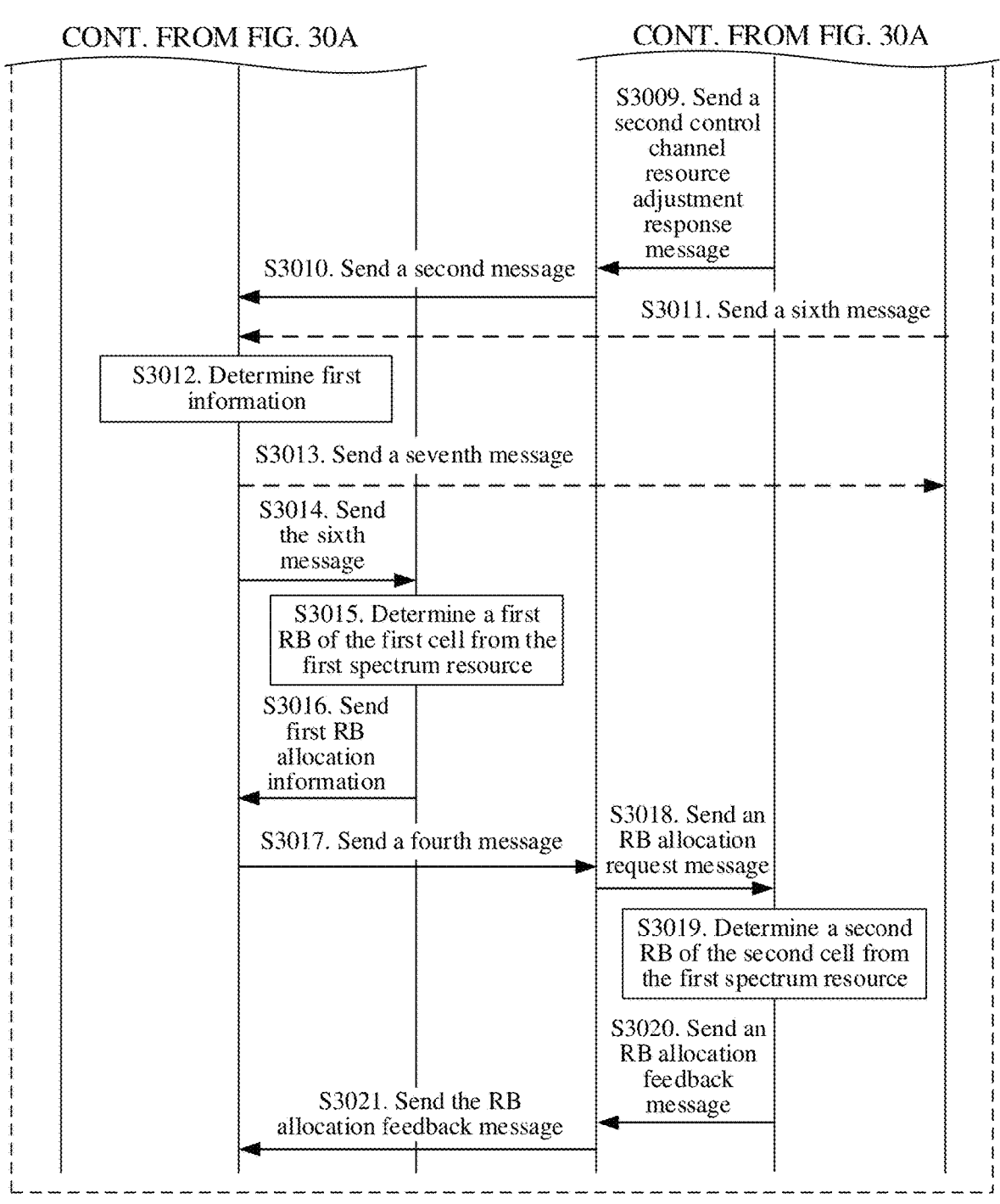

FIG. 30A and FIG. 30B are schematic diagrams of a resource sharing method 3000 according to at least one embodiment. In a CU-DU architecture, the first network device includes a decoupled CU-CP1 and a DU1. The second network device includes a decoupled CU-CP2 and a DU2. As shown in FIG. 30A and FIG. 30B, the method includes the following steps:

S3001. A UE sends a third message to a CU-CP1.

For example, the UE sends a third message to a CU-CP1, where the third message includes at least one of information about reference signal received power and information about reference signal received quality of the second network device.

S3002. The CU-CP1 determines that a first cell and a second cell are cells that share a first spectrum resource.

For example, the CU-CP1 determines, based on the third message, that the first cell and the second cell are cells that share the first spectrum resource. The first cell belongs to the first network device, and the second cell belongs to the second network device.

Specifically, for the description in which the CU-CP1 determines that the first cell and the second cell are cells that share the first spectrum resource, refer to the related description in S2702 in which the first network device determines that the first cell and the second cell are cells that share the first spectrum resource. For brevity, details are not described in embodiments provided herein.

S3003. The CU-CP1 sends a first control channel resource adjustment request message to a DU1.

For example, the CU-CP1 sends a first control channel resource adjustment request message to the DU1, where the control channel resource adjustment request information includes at least one of identification information of the first cell and indication information that the first cell supports dynamic spectrum sharing.

S3004. The DU1 determines a first control channel resource of the first cell from the first spectrum resource.

For example, the DU1 determines a first control channel resource of the first cell from the first spectrum resource.

Specifically, for the related description that the DU1 determines the first control channel resource of the first cell from the first spectrum resource, refer to the description in S501 that the first network device determines the first control channel resource of the first cell from the first spectrum resource. For brevity, details are not described in embodiments provided herein.

S3005. The DU1 sends a first control channel resource adjustment response message to the CU-CP1.

For example, the DU1 sends a first control channel resource adjustment response message to the CU-CP1, where the control channel resource adjustment response message includes uplink initial BWP information of the first cell, downlink initial BWP information of the first cell, and SSB configuration information of the first cell, for example, information about an SSB spectrum location of the first cell.

S3006. The CU-CP1 sends a first message to a CU-CP2.

For example, the CU-CP1 sends a first message to the CU-CP2, where the first message indicates the CU-CP2 to allocate the second control channel resource to the second cell from the first spectrum resource.

Specifically, for the related description that the CU-CP1 sends the first message to the CU-CP2, refer to the description in S502 that the first network device sends the first message to the second network device. For brevity, details are not described in embodiments provided herein.

S3007. The CU-CP2 sends a second control channel resource adjustment request message to a DU2.

For example, the CU-CP2 sends a second control channel resource adjustment request message to the DU2, where the second control channel resource adjustment request message includes at least one of the following information: identification information of the first cell, information about the first control channel resource, uplink initial BWP information of the first cell, downlink initial BWP information of the first cell, SSB configuration information of the first cell, identification information of the second cell, and indication information that the second cell supports dynamic spectrum sharing.

S3008. The DU2 determines a second control channel resource of the second cell from the first spectrum resource.

For example, after receiving the first message sent by the CU-CP2, the DU2 allocates the second control channel resource to the second cell. The first control channel resource and the second control channel resource belong to different parts of the first spectrum resource.

Specifically, for the description that the DU2 determines the second control channel resource of the second cell from the first spectrum resource, refer to the related description in S503 that the second network determines the second control channel resource of the second cell from the first spectrum resource. For brevity, details are not described in embodiments provided herein.

S3009. The DU2 sends a second control channel resource adjustment response message to the CU-CP2.

For example, the CU-CP2 sends a second control channel resource adjustment response message to the DU2, where the second control channel resource adjustment response message includes at least one of the following information: uplink initial BWP information of the second cell, downlink initial BWP information of the second cell, and SSB configuration information of the first cell.

S3010. The CU-CP2 sends a second message to the CU-CP1.

For example, the CU-CP2 sends a second message to the CU-CP1, and the second message includes at least one of the following information: uplink initial BWP information of the second cell, downlink initial BWP information of the second cell, SSB configuration information of the second cell, and information about the second control channel resource.

S3011. A TPF entity sends a sixth message to a CU-CP1 device.

Optionally, the TPF entity sends the sixth message to the CU-CP1, where the sixth message includes first information, and the first information includes information about predicted telephone traffic or information about predicted service traffic of the first cell.

Specifically, for the description of the first information, refer to the description of the first information in S2707. For brevity, details are not described in embodiments provided herein.

S3012. The CU-CP1 determines first information.

For example, the CU-CP1 determines the first information based on the sixth message.

S3013. The CU-CP1 sends a seventh message to the TPF entity.

Optionally, after determining the first information, the CU-CP1 sends a seventh message to the TPF entity, where the seventh message indicates that the CU-CP1 has received the sixth message.

In response to the first network device including a function of the TPF entity, S3011 and S3013 is omitted, and the CU-CP1 independently determines the first information.

S3014. The CU-CP1 sends sixth information to the DU1.

For example, the CU-CP1 sends the sixth information including the first information to the DU1.

S3015. The DU1 determines a first RB of the first cell from the first spectrum resource.

For example, the DU1 determines the first RB of the first cell from the first spectrum resource. The first control channel resource, the second control channel resource, and the first RB belong to different parts of the first spectrum resource.

Specifically, for the description that the DU1 determines the first RB of the first cell from the first spectrum resource, refer to the description in S1601 that the first network device determines the first RB of the first cell from the first spectrum resource. For brevity, details are not described in embodiments provided herein.

S3016. The DU1 sends first RB allocation information to the CU-CP1.

For example, the DU1 sends the first RB allocation information to the CU-CP1, where the first RB allocation information includes information about the first RB.

S3017. The CU-CP1 sends a fourth message to the CU-CP2.

For example, after determining the first RB of the first cell, the CU-CP1 sends the fourth message to the CU-CP2, where the fourth message indicates the second network device to allocate a second RB to the second cell from the first spectrum resource, the first RB and the second RB belong to different parts of the first spectrum resource, and the first spectrum resource is a spectrum resource shared by the first cell and the second cell.

Specifically, for the description of the fourth message, refer to the related description of the first message in S1602. For brevity, details are not described in embodiments provided herein.

S3018. The CU-CP2 sends an RB allocation request message to the DU2.

For example, after receiving the fourth message, the CU-CP2 sends the RB allocation request message to the DU2, where the RB allocation request message includes identification information of the second cell, and at least one of information in information about the first spectrum resource other than the first RB in the first spectrum resource.

S3019. The DU2 determines a second RB of the second cell from the first spectrum resource.

For example, the DU2 determines the second RB of the second cell based on information included in the fourth message. The first control channel resource, the second control channel resource, the first RB, and the second RB belong to different parts of the first spectrum resource.

Specifically, for the description that the DU2 determines the second RB of the second cell, refer to the related description in S1603 that the second network device determines the second RB. For brevity, details are not described in embodiments provided herein.

S3020. The DU2 sends an RB allocation feedback message to the CU-CP2.

For example, after determining the second RB of the second cell, the DU2 sends the RB allocation feedback message to the CU-CP2, where the RB allocation feedback message includes information about the second RB.

S3021. The CU-CP2 sends a fifth message to the CU-CP1.

For example, the CU-CP2 sends the fifth message to the CU-CP1, and the fifth message includes information about the second RB of the second cell.

Based on the foregoing solution, a dynamic spectrum sharing mechanism is applied, an F1/Xn interface defines a new message and a new cell, supports dynamic negotiation of spectrum sharing between cells, enables dynamic spectrum sharing between cells in a wireless network, supports allocation of control channel resources and RBs between two cells, and ensures that the control channel resources and the RBs between cells do not overlap on a shared spectrum resource. Define a new function, that is, a service traffic prediction function. The service traffic prediction of a cell is supported by defining a new interface, a new message, and a new cell between the CU-CP or the DU and the TPF entity. In response to a wireless network being lightly loaded, a spectrum of the wireless network is shared with another wireless network for use, thereby improving user experience and usage efficiency of spectrum resources.

Figure 31:
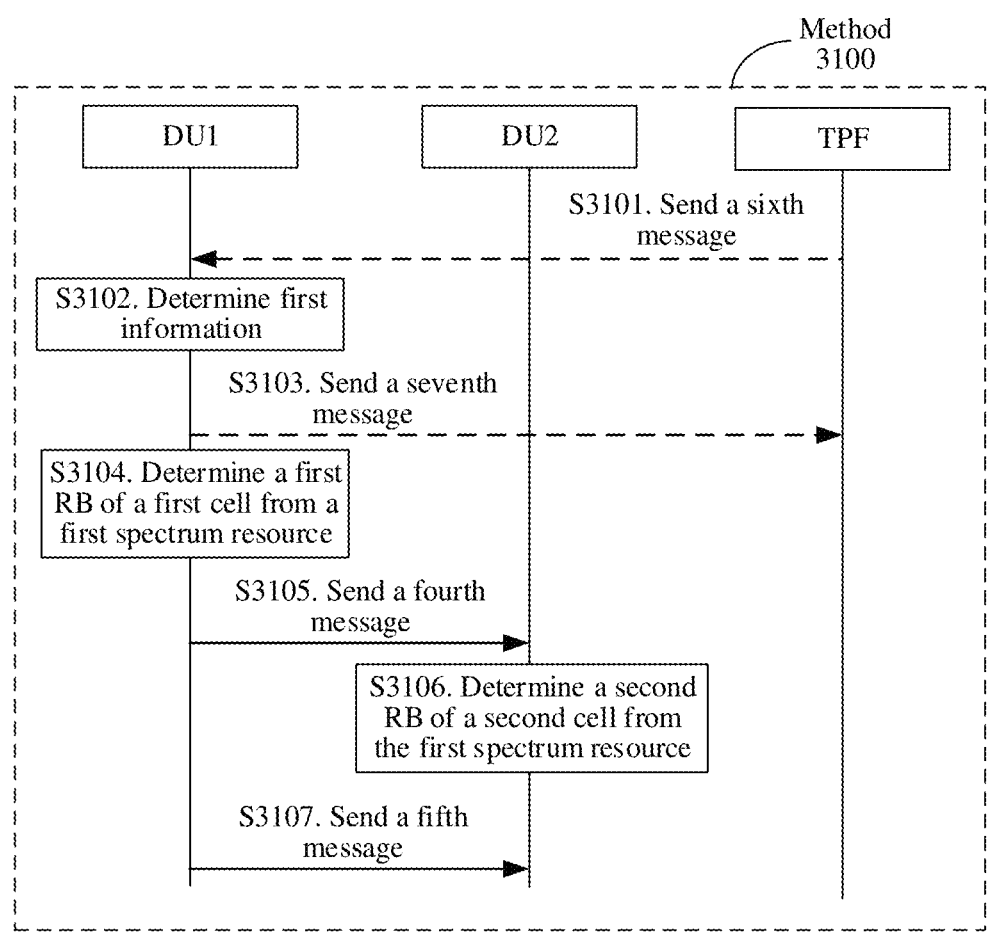
FIG. 31 is a schematic diagram of a resource sharing method 3100 according to at least one embodiment.

FIG. 31 is a schematic diagram of a resource sharing method 3100 according to at least one embodiment. In a CU-DU architecture, a DU1 belongs to a first network device, and a DU2 belongs to a second network device. As shown in FIG. 31, the method includes the following steps:

S3101. A TPF entity sends a sixth message to a DU1.

Optionally, the TPF entity sends the sixth message to the DU1, where the sixth message includes first information. The first information includes information about predicted telephone traffic or information about predicted service traffic of the first cell, and the first cell belongs to the first network device.

Specifically, the first information is at least one type of the following information: a service traffic of the first network device in a next TTI at a current TTI, a service traffic of the first network device in a plurality of future TTIs at a current TTI, an average service traffic of the first network device in a next period at a current TTI, a maximum service traffic of the first network device in a next period at a current TTI, or a minimum service traffic of the first network device in a next period at a current TTI.

S3102. The DU1 determines first information.

For example, the DU1 determines the first information based on the sixth message.

S3103. The DU1 sends a seventh message to a TPF entity.

Optionally, after determining the first information, the DU1 sends the seventh message to the TPF entity, where the seventh message indicates that the DU1 has received the sixth message.

In response to the DU1 including a function of the TPF entity, S3107 and 53109 is omitted, and the DU1 independently determines the first information.

S3104. The DU1 determines a first RB of a first cell from a first spectrum resource.

For example, the DU1 determines the first RB of the first cell from the first spectrum resource.

Specifically, for the description that the DU1 determines the first RB of the first cell from the first spectrum resource, refer to the description in S1601 that the first network device determines the first RB of the first cell from the first spectrum resource. For brevity, details are not described in embodiments provided herein.

S3105. The DU1 sends a fourth message to a DU2.

For example, after determining the first RB of the first cell, the DU1 sends the fourth message to the DU2, where the fourth message indicates the DU2 to allocate a second RB to a second cell from the first spectrum resource, the first RB and the second RB belong to different parts of the first spectrum resource, the first spectrum resource is a spectrum resource shared by the first cell and the second cell, and the second cell belongs to the second network device.

Specifically, for the description of the fourth message, refer to the related description of the first message in S1602. For brevity, details are not described in embodiments provided herein.

S3106. The DU2 determines a second RB of a second cell from the first spectrum resource.

For example, the DU2 determines the second RB of the second cell based on information included in the fourth message.

Specifically, for the description that the DU2 determines the second RB of the second cell, refer to the related description in S1603 that the second network device determines the second RB. For brevity, details are not described in embodiments provided herein.

S3107. The DU2 sends a fifth message to the DU1.

For example, the DU2 sends the fifth message to the DU1, and the fifth message includes information about the second RB of the second cell.

Based on the foregoing solution, a dynamic spectrum sharing mechanism is applied, a new message and a new cell are defined, dynamic negotiation of spectrum sharing between cells is supported, dynamic spectrum sharing is enabled between cells in a wireless network, RB allocation of two cells is supported, and RBs between cells do not overlap on a shared spectrum resource are ensured. Define a new function, that is, a service traffic prediction function. The service traffic prediction of a cell is supported by defining a new interface, a new message, and a new cell between the DU and the TPF entity. In response to a wireless network being lightly loaded, a spectrum of the wireless network is shared with another wireless network for use, thereby improving user experience and usage efficiency of spectrum resources.

Embodiments described in this specification is independent solutions, or is combined based on internal logic. All these solutions fall within the protection scope of embodiments described herein.

In the foregoing method embodiments, methods and operations implemented by the terminal device is further implemented by a component (for example, a chip or a circuit) that is used in the terminal device, and methods and operations implemented by the network device is further implemented by a component (for example, a chip or a circuit) that is used in the network device.

The foregoing describes in detail the methods provided in at least one embodiment with reference to FIG. 5 to FIG. 31. The following describes in detail the communication apparatus provided in at least one embodiment with reference to FIG. 32 to FIG. 35. Descriptions of apparatus embodiments correspond to descriptions of method embodiments. Therefore, for content that is not described in detail, refer to the foregoing method embodiments. For brevity, details are not described herein again.

The foregoing mainly describes the solutions provided in at least one embodiment from a perspective of interaction between network elements. To implement the foregoing functions, each network element, for example, a transmit end device or a receive end device, includes a corresponding hardware structure and/or a corresponding software module for performing each function. A person skilled in the art should be aware that units and algorithm steps in the examples described with reference to embodiments disclosed herein is implemented in a form of hardware or a combination of hardware and computer software in at least one embodiment. Whether a function is performed through hardware or hardware driven by computer software depends on particular applications and design constraint conditions of the technical solutions. A person skilled in the art is able to use different methods to implement the described functions for each particular application, but the implementation does not go beyond the scope of at least one embodiment.

In at least one embodiment, functional modules of the transmit end device or the receive end device is obtained through division based on the foregoing method examples. For example, each functional module is obtained through division based on each function, or two or more functions is integrated into one processing module. The integrated module is implemented in a form of hardware, or is implemented in a form of a software functional module. In at least one embodiment, the module division is an example, and is merely logical function division. There is another division manner in an actual implementation. The following provides description by using an example in which each function is obtained through division of each functional module corresponding to each function.

Figure 32:
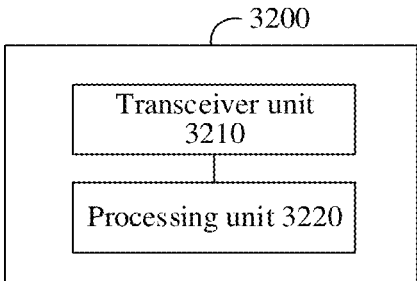
FIG. 32 is a schematic block diagram of a communication apparatus 3200 according to at least one embodiment.

FIG. 32 is a schematic block diagram of a communication apparatus 3200 according to at least one embodiment. The communication apparatus 3200 includes a transceiver unit 3210 and a processing unit 3220. The transceiver unit 3210 implements a corresponding communication function, and the processing unit 3210 is configured to perform data processing. The transceiver unit 3210 is also referred to as a communication interface or a communication unit.

Optionally, the communication apparatus 3200 further includes a storage unit. The storage unit is configured to store instructions and/or data. The processing unit 3220 reads the instructions and/or data in the storage unit, to enable the communication apparatus to implement the foregoing method embodiments.

The communication apparatus 3200 is configured to perform actions performed by the network device in the foregoing method embodiments. In this case, the communication apparatus 3200 is a network device or a component that is configured in the network device. The transceiver unit 3210 is configured to perform a transceiving-related operation on a network device side in the foregoing method embodiments. The processing unit 3220 is configured to perform a processing-related operation on a network device side in the foregoing method embodiments.

The communication apparatus 3200 implements steps or procedures performed by the network device in the method 500, the method 1600, the method 27, the method 30, and the method 3100 according to at least one embodiment. The communication apparatus 3200 includes units configured to perform methods performed by the network device in the method 500 in FIG. 5, the method 1600 in FIG. 16, the method 2700 in FIG. 27, the method 3000 in FIG. 30A and FIG. 30B, and the method 3100 in FIG. 31. In addition, the units in the communication apparatus 3200 and the foregoing other operations and/or functions are respectively used to implement corresponding procedures in the method 500 in FIG. 5, the method 1600 in FIG. 16, the method 2700 in FIG. 27, the method 3000 in FIG. 30A and FIG. 30B, and the method 3100 in FIG. 31.

In response to the communication apparatus 3200 being configured to perform the first network device in the method 500 in FIG. 5, the transceiver unit 3210 is configured to perform step 502 in the method 500. The processing unit 3220 is configured to perform step 501 in the method 500.

In another example, in response to the communication apparatus 3200 being configured to perform the first network device in the method 500 in FIG. 5, the transceiver unit 3210 is configured to perform step 502 in the method 500. The processing unit 3220 is configured to perform step 501 in the method 500.

In another example, in response to the communication apparatus 3200 being configured to perform the second network device in the method 500 in FIG. 5, the transceiver unit 3210 is configured to perform step 502 in the method 500. The processing unit 3220 is configured to perform step 503 in the method 500.

In another example, in response to the communication apparatus 3200 being configured to perform the first network device in the method 1600 in FIG. 16, the transceiver unit 3210 is configured to perform step 1602 in the method 1600. The processing unit 3220 is configured to perform step 1601 in the method 1600.

In another example, in response to the communication apparatus 3200 being configured to perform the second network device in the method 1600 in FIG. 16, the transceiver unit 3210 is configured to perform step 1602 in the method 1600. The processing unit 3220 is configured to perform step 1603 in the method 500.

In another example, in response to the communication apparatus 3200 being configured to perform the first network device in the method 2700 in FIG. 27, the transceiver unit 3210 is configured to perform steps 2701, 2704, 2706, 2707, 2709, 2711, and 2713 in the method 2700. The processing unit 3220 is configured to perform steps 2702, 2703, 2708, and 2710 in the method 2700.

In another example, in response to the communication apparatus 3200 being configured to perform the second network device in the method 500 in FIG. 27, the transceiver unit 3210 is configured to perform steps 2704, 2711, and 2713 in the method 2700. The processing unit 3220 is configured to perform steps 2705 and 2712 in the method 2700.

In another example, in response to the communication apparatus 3200 being configured to perform the CU-CP1 in the method 3000 in FIG. 30A and FIG. 30B, the transceiver unit 3210 is configured to perform steps 3001, 3003, 3005, 3006, 3010, 3011, 3013, 3014, 3016, 3017, and 3021 in the method 3000. The processing unit 3220 is configured to perform steps 3002 and 3012 in the method 3000.

In another example, in response to the communication apparatus 3200 being configured to perform the DU1 in the method 3000 in FIG. 30A and FIG. 30B, the transceiver unit 3210 is configured to perform steps 3003, 3005, 3014, and 3016 in the method 3000. The processing unit 3220 is configured to perform steps 3004 and 3015 in the method 3000.

In another example, in response to the communication apparatus 3200 being configured to perform the CU-CP2 in the method 3000 in FIG. 30A and FIG. 30B, the transceiver unit 3210 is configured to perform steps 3006, 3007, 3009, 3010, 3017, 3018, 3020, and 3021 in the method 3000.

In another example, in response to the communication apparatus 3200 being configured to perform the DU2 in the method 3000 in FIG. 30A and FIG. 30B, the transceiver unit 3210 is configured to perform steps 3007, 3009, 3018, and 3020 in the method 3000. The processing unit 3220 is configured to perform steps 3008 and 3019 in the method 3000.

In another example, in response to the communication apparatus 3200 being configured to perform the DU1 in the method 3100 in FIG. 31, the transceiver unit 3210 is configured to perform steps 3101, 3103, 3105, and 3107 in the method 3100. The processing unit 3220 is configured to perform steps 3102 and 3104 in the method 3100.

In another example, in response to the communication apparatus 3200 being configured to perform the DU2 in the method 3100 in FIG. 31, the transceiver unit 3210 is configured to perform steps 3105 and 3107 in the method 3100. The processing unit 3220 is configured to perform step 3106 in the method 3100.

The processing unit 3220 in the foregoing embodiments is implemented by at least one processor or a processor-related circuit. The transceiver unit 3210 is implemented by using a transceiver or a transceiver-related circuit. The transceiver unit 3210 is also referred to as a communication unit or a communication interface. The storage unit is implemented by using at least one memory.

Figure 33:
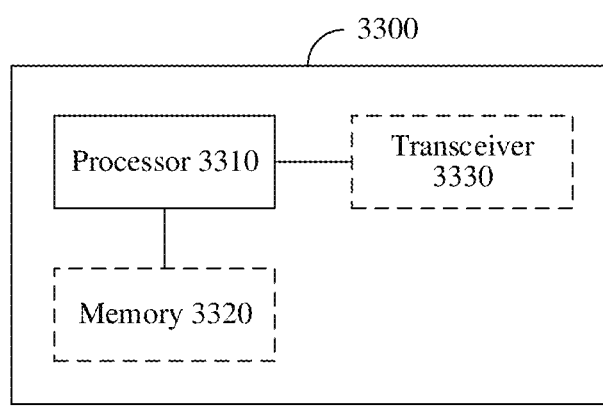
FIG. 33 is a schematic block diagram of a communication apparatus 3300 according to at least one embodiment.

As shown in FIG. 33, at least one embodiment further provides a communication apparatus 3300. The communication apparatus 3300 includes a processor 3310. The processor 3310 is coupled to a memory 3320. The memory 3320 is configured to store a computer program or instructions and/or data. The processor 3310 is configured to perform the computer program or the instructions and/or data stored in the memory 3320, so that the method in the foregoing method embodiments is performed.

Optionally, the communication apparatus 3300 includes one or more processors 3310.

Optionally, as shown in FIG. 33, the communication apparatus 3300 further includes a memory 3320.

Optionally, the communication apparatus 3300 includes one or more memories 3320.

Optionally, the memory 3320 is integrated with the processor 3310, or is disposed separately.

Optionally, as shown in FIG. 33, the communication apparatus 3300 further includes a transceiver 3330. The transceiver 3330 is configured to receive and/or send a signal. For example, the processor 3310 is configured to control the transceiver 3330 to receive and/or send the signal.

In a solution, the communication apparatus 3300 is configured to perform operations performed by the terminal device in the foregoing method embodiments.

For example, the processor 3310 is configured to perform processing-related operations performed by the terminal device in the foregoing method embodiments, and the transceiver 3330 is configured to perform transceiving-related operations performed by the terminal device in the foregoing method embodiments.

In another solution, the communication apparatus 3300 is configured to implement operations performed by the network device in the foregoing method embodiments.

For example, the processor 3310 is configured to implement processing-related operations performed by the network device in the foregoing method embodiments, and the transceiver 3330 is configured to implement transceiving-related operations performed by the network device in the foregoing method embodiments.

Embodiments described herein further provide a communication apparatus 3400. The communication apparatus 3400 is a terminal device or is a chip. The communication apparatus 3400 is configured to perform operations performed by the terminal device in the foregoing method embodiments.

Figure 34:
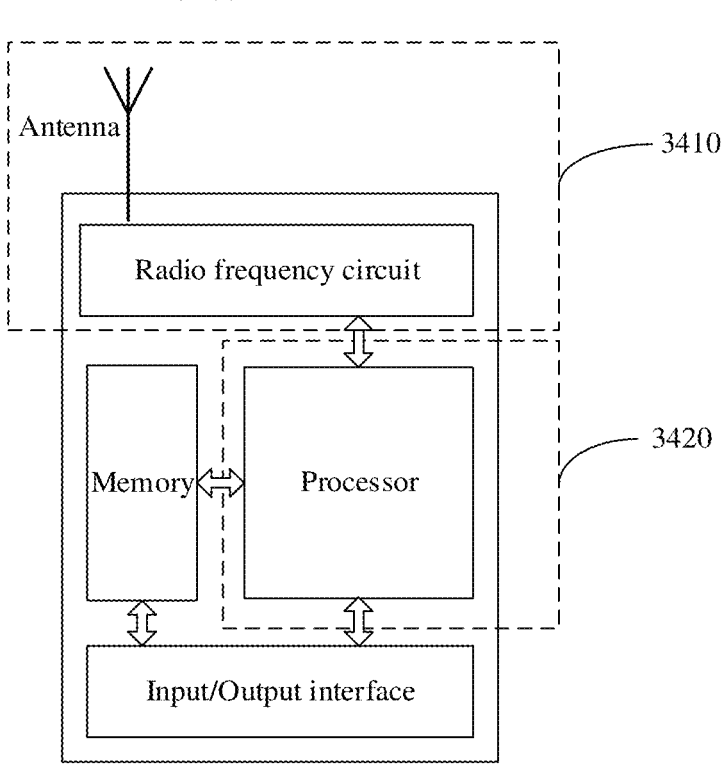
FIG. 34 is a schematic structural diagram of a simplified terminal device 3400 according to at least one embodiment.

In response to the communication apparatus 3400 being a terminal device, FIG. 34 is a schematic structural diagram of a simplified terminal device 3400. As shown in FIG. 34, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to receive and send the radio frequency signal in a form of an electromagnetic wave. The input/output apparatus, for example, a touchscreen, a display, or a keyboard, is mainly configured to receive data input by a user and output data to the user. Terminal devices of some types do not have the input/output apparatus.

In response to data being sent, the processor performs baseband processing on the data to be sent, and then outputs a baseband signal to a radio frequency circuit. The radio frequency circuit performs radio frequency processing on the baseband signal, and then sends out a radio frequency signal through the antenna in a form of an electromagnetic wave. In response to data being sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 34 shows only one memory and one processor. In an actual terminal device product, there is one or more processors and one or more memories. The memory is also referred to as a storage medium, a storage device, or the like. The memory is disposed independent of the processor, or is integrated with the processor. This is not limited in at least one embodiment.

In at least one embodiment, the antenna and the radio frequency circuit that have a transceiver function is considered as a transceiver unit of the terminal device, and the processor that has a processing function is considered as a processing unit of the terminal device.

As shown in FIG. 34, a terminal device includes a transceiver unit 3410 and a processing unit 3420. The transceiver unit 3410 is also referred to as a transceiver, a transceiver machine, a transceiver apparatus, or the like. The processing unit 3420 is also referred to as a processor, a processing board, a processing module, a processing apparatus, or the like.

Optionally, a component configured to implement a receiving function in the transceiver unit 3410 is considered as a receiving unit, and a component configured to implement a sending function in the transceiver unit 3410 is considered as a sending unit. That is, the transceiver unit 3410 includes a receiving unit and a sending unit. The transceiver unit sometimes is also referred to as a transceiver machine, a transceiver, a transceiver circuit, or the like. The receiving unit sometimes is also referred to as a receiver machine, a receiver, a receive circuit, or the like. The sending unit sometimes is also referred to as a transmitter machine, a transmitter, a transmit circuit, or the like.

FIG. 34 is merely an example rather than a limitation. The terminal device including the transceiver unit and the processing unit does not depend on the structure shown in FIG. 34.

In response to the communication apparatus 3400 being a chip, the chip includes a transceiver unit and a processing unit. The transceiver unit is an input/output circuit or a communication interface. The processing unit is a processor integrated on the chip, a microprocessor, or an integrated circuit.

Embodiments described herein further provide a communication apparatus 3500. The communication apparatus 3500 is a network device or is a chip. The communication apparatus 3500 is configured to perform operations performed by the network device in the foregoing method embodiments.

Figure 35:
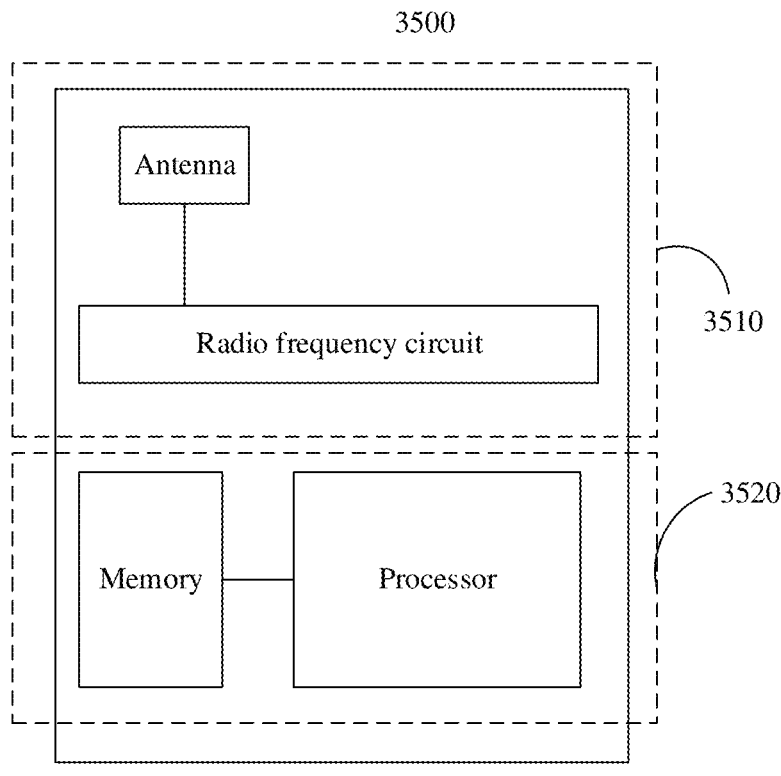
FIG. 35 is a schematic structural diagram of a simplified base station 3500 according to at least one embodiment.

In response to the communication apparatus 3500 being a network device, for example, a base station. FIG. 35 is a schematic structural diagram of a simplified base station 3500. The base station includes part 3510 and part 3520. The 3510 part is mainly configured to receive and send a radio frequency signal and perform conversion between a radio frequency signal and a baseband signal. The 3520 part is mainly configured to perform baseband processing, control a base station, and the like. The part 3510 usually is referred to as a transceiver unit, a transceiver machine, a transceiver circuit, a transceiver, or the like. The part 3520 is usually a control center of the base station, usually is referred to as a processing unit, and is configured to control the base station to perform processing operations on a network device side in the foregoing method embodiments.

The transceiver unit in the part 3510 is also referred to as a transceiver machine, a transceiver, or the like. The transceiver unit includes an antenna and a radio frequency circuit, where the radio frequency circuit is mainly configured to perform radio frequency processing. Optionally, a component configured to implement a receiving function in part 3510 is considered as a receiving unit, and a component configured to implement a sending function in part 3510 is considered as a sending unit. That is, part 3510 includes a receiving unit and a sending unit. The receiving unit is also referred to as a receiving machine, a receiver, a receiving circuit, or the like. The sending unit is referred to as a transmitter machine, a transmitter, a transmitting circuit, or the like.

Part 3520 includes one or more boards, and each board includes one or more processors and one or more memories. The processor is configured to read and execute a program in the memory, to implement a baseband processing function and control the base station. In response to there being a plurality of boards, the boards is interconnected to each other, to enhance a processing capability. In an optional implementation, the plurality of boards share one or more processors, or the plurality of boards share one or more memories, or the plurality of boards share one or more processors at the same time.

For example, in an implementation, the transceiver unit in part 3510 is configured to perform transceiving-related steps performed by the network device in embodiments shown in FIG. 5. The part 3520 is configured to perform processing-related steps performed by the network device in embodiments shown in FIG. 5.

For example, in still another implementation, the transceiver unit in part 3510 is configured to perform transceiving-related steps performed by the network device in embodiments shown in FIG. 16. The part 3520 is configured to perform processing-related steps performed by the network device in embodiments shown in FIG. 16.

For example, in still another implementation, the transceiver unit in part 3510 is configured to perform transceiving-related steps performed by the network device in embodiments shown in FIG. 27. The part 3520 is configured to perform processing-related steps performed by the network device in embodiments shown in FIG. 27.

For example, in still another implementation, the transceiver unit in part 3510 is configured to perform transceiving-related steps performed by the network device in embodiments shown in FIG. 30A and FIG. 30B. The part 3520 is configured to perform processing-related steps performed by the network device in embodiments shown in FIG. 30A and FIG. 30B.

For example, in still another implementation, the transceiver unit in part 3510 is configured to perform transceiving-related steps performed by the network device in embodiments shown in FIG. 31. The part 3520 is configured to perform processing-related steps performed by the network device in embodiments shown in FIG. 31.

FIG. 35 is merely an example rather than a limitation. The network device including the transceiver unit and the processing unit do not depend on the structure shown in FIG. 35.

In response to the communication apparatus 3500 being a chip, the chip includes a transceiver unit and a processing unit. The transceiver unit is an input/output circuit or a communication interface. The processing unit is a processor integrated on the chip, a microprocessor, or an integrated circuit.

Embodiments described herein further provide a computer-readable storage medium. The computer-readable storage medium stores computer instructions for implementing the method performed by the terminal device or the method performed by the network device in the foregoing method embodiments.

For example, in response to a computer program being executed by a computer, the computer is enabled to implement the method performed by the terminal device or the method performed by the network device in the foregoing method embodiments.

Embodiments described herein further provide a computer program product including instructions. In response to the instructions being executed by a computer, the computer is enabled to implement the method performed by the terminal device or the method performed by the network device in the foregoing method embodiments.

Embodiments described herein further provide a communication system. The communication system includes the network device and the terminal device in the foregoing embodiments.

A person skilled in the art understands that, for the purpose of convenient and brief description, for explanations of related content and beneficial effects in any of the foregoing provided communication apparatuses, refer to corresponding method embodiments provided above. Details are not described herein again.

In embodiments described herein, the terminal device or the network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (which is also referred to as a main memory). An operating system at the operating system layer is any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software.

A specific structure of an execution body of the method provided in embodiments described herein is not particularly limited, provided that communication is performed based on the method provided by running a program that records code of the method provided in embodiments described herein. For example, the method provided in at least one embodiment is executed by a terminal device or a network device, or a functional module that is in the terminal device or the network device and that can invoke a program and execute the program.

Various aspects or features embodiments described herein are implemented as a method, an apparatus, or a product using standard programming and/or engineering techniques. The term "product" used herein covers a computer program accessible from any computer-readable device, carrier, or medium.

The computer-readable storage medium is any usable medium accessible by the computer, or a data storage device, for example, a server or a data center, integrating one or more usable media. The usable medium (or the computer-readable medium) includes, for example, but is not limited to: any medium that stores program code, such as a magnetic medium or a magnetic storage device (for example, a floppy disk, a hard disk (for example, a removable hard disk), or a magnetic tape), an optical medium (for example, an optical disc, a compact disc (compact disc, CD), a digital versatile disc (digital versatile disc, DVD), and the like), a smart card and a flash memory component (for example, an erasable programmable read-only memory (erasable programmable read-only memory, EPROM), a card, a stick, a key drive, or the like), or a semiconductor medium (for example, a solid state drive (Solid state drive, SSD), a USB flash drive, a read-only memory (read-only memory, ROM), or a random access memory (random access memory, RAM).

Various storage media described herein indicates one or more devices and/or other machine-readable media for storing information. The term "machine-readable medium" includes, but is not limited to: a radio channel and various other media that stores, contains, and/or carries instructions and/or data.

The processor mentioned in embodiments described herein is a central processing unit (central processing unit, CPU), or further is another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or a transistor logic device, a discrete hardware component, or the like. The general-purpose processor is a microprocessor, or the processor is any conventional processor, or the like.

The memory in embodiments described herein is a volatile memory or a non-volatile memory, or includes a volatile memory and a non-volatile memory. The non-volatile memory is a read-only memory (read-only memory, ROM), a programmable ROM (programmable ROM, PROM), an erasable PROM (erasable PROM, EPROM), an electrically EPROM (electrically EPROM, EEPROM), or a flash memory. The volatile memory is a random access memory (random access memory, RAM). For example, RAM is used as an external cache. As an example rather than a limitation, the RAM includes the following a plurality of forms: a static random access memory (static RAM, SRAM), a dynamic RAM (dynamic RAM, DRAM), a synchronous DRAM (synchronous DRAM, SDRAM), a double data rate SDRAM (double data rate SDRAM, DDR SDRAM), an enhanced synchronous dynamic random access memory (enhanced SDRAM, ESDRAM), a synchlink DRAM (synchlink DRAM, SLDRAM), and a direct rambus RAM (direct rambus RAM, DR RAM).

In response to the processor being a general-purpose processor, a DSP, an ASIC, an FPGA or another programmable logic device, a discrete gate or a transistor logic device, or a discrete hardware component, a memory (a storage module) is integrated into the processor.

The memory described in herein is intended to include, but is not limited to, these and any other suitable type of memory.

In at least one embodiment, the disclosed apparatus and method is implemented in other manners. For example, the described apparatus embodiment is merely an example. For example, division into the units is merely logical function division and is other division during actual implementation. For example, a plurality of units or components is combined or integrated into another system, or some features is ignored or not performed. In addition, the displayed or discussed mutual couplings or direct couplings or communication connections is implemented by using some interfaces. The indirect couplings or communication connections between the apparatuses or units is implemented in an electronic form, a mechanical form, or another form.

The foregoing units described as separate parts may or may not be physically separate, and parts displayed as units may or may not be physical units, in other words, is located in one position, or is distributed on a plurality of network units. A part or all of the units is selected based on actual implementation of the solutions provided in embodiments described herein.

In addition, function units in embodiments described herein is integrated into one unit, each of the units exist alone physically, or two or more units are integrated into one unit.

All or a part of the foregoing embodiments is implemented by software, hardware, firmware, or any combination thereof. In response to software being used to implement the embodiments, all or a part of the embodiments is implemented in a form of a computer program product. The computer program product includes one or more computer instructions. In response to the computer program instructions being loaded and executed on a computer, the procedures or functions based on at least one embodiment are all or partially generated. The computer is a general-purpose computer, a dedicated computer, a computer network, or another programmable apparatus. The computer instructions is stored in a computer-readable storage medium or is transmitted from a computer-readable storage medium to another computer-readable storage medium. For example, the computer instructions is transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by the computer, or a data storage device, such as a server or a data center, integrating one or more usable media.

The foregoing descriptions are merely specific implementations of at least one embodiment, but are not intended to limit the protection scope embodiments described herein. Any variation or replacement readily figured out by a person skilled in the art within the technical scope disclosed herein shall fall within the protection scope of at least one embodiment. Therefore, the protection scope of embodiments described herein shall be subject to the protection scope of the claims and description of embodiments provided herein.

What is claimed is:

1. A resource sharing method, comprising:
determining, by a first network device, a first control channel resource of a first cell from a first spectrum resource, wherein the first cell belongs to the first network device; and
sending, by the first network device, a first message to a second network device, wherein the first message indicates the second network device to allocate a second control channel resource to a second cell in the first spectrum resource, the second cell belongs to the second network device, the first control channel resource and the second control channel resource belong to different parts of the first spectrum resource, and the first spectrum resource is a spectrum resource shared by the first cell and the second cell.

2. The method according to claim 1, wherein the sending the first message includes sending at least one of the following information:
identification information of the first cell, information about the first control channel resource, uplink initial bandwidth part (BWP) information of the first cell, downlink initial BWP information of the first cell, synchronization signal block (SSB) configuration information of the first cell, or identification information of the second cell.

3. The method according to claim 1, wherein the method further comprises:
receiving, by the first network device, a second message sent by the second network device, wherein the second message includes at least one of the following information:
uplink initial BWP information of the second cell, downlink initial BWP information of the second cell, SSB configuration information of the second cell, and information about the second control channel resource.

4. The method according to claim 1, wherein the sending the identification information of the first cell, information about the first control channel resource includes:
sending the first control channel resource in a start part of the first spectrum resource, wherein the second control channel resource is in an end part of the first spectrum resource; or
sending the first control channel resource in an end part of the first spectrum resource, wherein the second control channel resource is in a start part of the first spectrum resource.

5. The method according to claim 1, wherein the method further comprises:

receiving, by the first network device, a third message sent by a terminal device, wherein the third message includes at least one of information about reference signal received power or information about reference signal received quality of the second network device; and determining, by the first network device based on the third message, that the first cell and the second cell are cells that share the first spectrum resource.

6. The method according to claim 5, wherein the determining that the first cell and the second cell are cells that share the first spectrum resource includes:

in response to the first cell and the second cell satisfying a preset condition, determining, by the first network device, that the first cell and the second cell are cells that share the first spectrum resource.

7. The method according to claim 6, wherein the satisfying the preset condition includes satisfying at least one of the following conditions:

a coverage range of the first cell and a coverage range of the second cell at least partially overlap, or the first cell and the second cell are capable of sharing a spectrum resource.

8. The method according to claim 1, wherein the method further comprises:

determining, by the first network device, a first resource block (RB) of the first cell from the first spectrum resource; and sending, by the first network device, a fourth message to the second network device, wherein the fourth message indicates the second network device to allocate a second RB to the second cell from the first spectrum resource, and the first RB, the second RB, the first control channel resource, and the second control channel resource belong to different parts of the first spectrum resource.

9. A first network device, comprising:

at least one processor; and one or more memories including computer instructions that, in response to executed by the at least one processor, cause the at least one processor to perform operations comprising:

determining a first control channel resource of a first cell from a first spectrum resource, wherein the first cell belongs to the first network device; and sending a first message to a second network device, wherein the first message indicates the second network device to allocate a second control channel resource to a second cell in the first spectrum resource, the second cell belongs to the second network device, the first control channel resource and the second control channel resource belong to different parts of the first spectrum resource, and the first spectrum resource is a spectrum resource shared by the first cell and the second cell.

10. The first network device according to claim 9, wherein the first message includes at least one of the following information:

identification information of the first cell, information about the first control channel resource, uplink initial bandwidth part (BWP) information of the first cell, downlink initial BWP information of the first cell, synchronization signal block (SSB) configuration information of the first cell, or identification information of the second cell.

11. The first network device according to claim 9, wherein the at least one processor is further configured to perform operations of:

receiving a second message sent by the second network device, wherein the second message includes at least one of the following information:

uplink initial BWP information of the second cell, downlink initial BWP information of the second cell, SSB configuration information of the second cell, or information about the second control channel resource.

12. The first network device according to claim 9, wherein the first control channel resource is in a start part of the first spectrum resource, and the second control channel resource is in an end part of the first spectrum resource; or the first control channel resource is in an end part of the first spectrum resource, and the second control channel resource is in a start part of the first spectrum resource.

13. A second network device, comprising:

at least one processor; and one or more memories including computer instructions that, in response to executed by the at least one processor, cause the processor to perform operations comprising:

receiving a first message sent by a first network device, wherein the first message indicates the second network device to allocate a second control channel resource to a second cell from a first spectrum resource, a first control channel resource of a first cell and the second control channel resource belong to different parts of the first spectrum resource, the first spectrum resource is a spectrum resource shared by the first cell and the second cell, the first cell belongs to the first network device, and the second cell belongs to the second network device; and determining the second control channel resource of the second cell from the first spectrum resource.

14. The second network device according to claim 13, wherein the first message includes at least one of the following information:

identification information of the first cell, information about the first control channel resource, uplink initial (BWP) information of the first cell, downlink initial BWP information of the first cell, synchronization signal block (SSB) configuration information of the first cell, or identification information of the second cell.

15. The second network device according to claim 13, wherein the processor is further configured to perform operations of:

sending a second message to the first network device, wherein the second message includes at least one of the following information:

uplink initial BWP information of the second cell, downlink initial BWP information of the second cell, SSB configuration information of the second cell, or information about the second control channel resource.

16. The second network device according to claim 13, wherein the first control channel resource is in a start part of the first spectrum resource, and the second control channel resource is in an end part of the first spectrum resource; or the first control channel resource is in an end part of the first spectrum resource, and the second control channel resource is in a start part of the first spectrum resource.

17. The second network device according to claim 13, wherein the first cell and the second cell satisfy a preset condition.

18. The second network device according to claim 17, wherein the preset condition includes at least one of the following conditions:

a coverage range of the first cell and a coverage range of the second cell at least partially overlap, or the first cell and the second cell are capable of sharing a spectrum resource.

19. The second network device according to claim 13, wherein the processor is further configured to perform operations of:

receiving a fourth message sent by the first network device, wherein the fourth message indicates the second network device to allocate a second resource block (RB) to the second cell from the first spectrum resource, and the first resource block (RB), the second RB, the first control channel resource, and the second control channel resource belong to different parts of the first spectrum resource; and determining the second RB of the second cell from the first spectrum resource.

20. The second network device according to claim 19, wherein the processor is further configured to perform operations of:

sending a fifth message to the first network device, wherein the fifth message includes information about the second RB.

* * * * *